United States Patent
Zheng et al.

(10) Patent No.: US 8,121,052 B2
(45) Date of Patent: Feb. 21, 2012

(54) FRAMEWORK FOR INTERNETWORKING BETWEEN WMAN AND WLAN NETWORKS

(75) Inventors: Haihong Zheng, Coppell, TX (US); Shashikant Maheshwari, Irving, TX (US); Basavaraj Patil, Coppell, TX (US); Srinivas Sreemanthula, Flower Mound, TX (US)

(73) Assignee: Nokia Siemens Networks Oy, Espoo (FI)

( * ) Notice: Subject to any disclaimer, the term of this patent is extended or adjusted under 35 U.S.C. 154(b) by 910 days.

(21) Appl. No.: 12/121,417

(22) Filed: May 15, 2008

(65) Prior Publication Data

US 2009/0285176 A1    Nov. 19, 2009

(51) Int. Cl.
*H04W 4/00* (2009.01)

(52) U.S. Cl. ......... 370/254; 370/331; 370/338; 370/401

(58) Field of Classification Search .................. None
See application file for complete search history.

(56) References Cited

U.S. PATENT DOCUMENTS

| | | | |
|---|---|---|---|
| 2006/0176853 A1 | 8/2006 | Liu et al. | |
| 2007/0047491 A1 | 3/2007 | Dutta et al. | |
| 2007/0160017 A1 | 7/2007 | Meier et al. | 370/338 |
| 2007/0280176 A1 | 12/2007 | Silverman et al. | 370/338 |
| 2008/0064402 A1 | 3/2008 | Oh | |
| 2008/0076430 A1 | 3/2008 | Olson | |
| 2008/0095118 A1* | 4/2008 | Cakulev et al. | 370/331 |
| 2008/0232272 A1 | 9/2008 | Gelbman et al. | |
| 2008/0233951 A1 | 9/2008 | Uchida et al. | |
| 2008/0254797 A1 | 10/2008 | Achtari et al. | |
| 2008/0273520 A1 | 11/2008 | Kim et al. | |
| 2009/0086660 A1* | 4/2009 | Sood et al. | 370/311 |
| 2009/0279502 A1 | 11/2009 | Zheng et al. | 370/331 |

FOREIGN PATENT DOCUMENTS

WO    2008/042869 A2    4/2008

OTHER PUBLICATIONS

"Part 16: Air Interface for Fixed Broadband Wireless Access Systems", IEEE Standard for Local and Metropolitan Area Network, IEEE Std 802.16 (Oct. 1, 2004), pp. 1-894.

Ergen, M., "Access Service Network in WiMAX: The role of ASN-GW—Part II", Retrieved on Apr. 1, 2008 from mobilehandsetdesignline.com/howto/202805223, pp. 1-8.

(Continued)

*Primary Examiner* — Chi H. Pham
*Assistant Examiner* — Shick Hom
(74) *Attorney, Agent, or Firm* — Brake Hughes Bellermann LLP

(57) ABSTRACT

According to one general aspect, a method of using a customer premises equipment (CPE) to represent a mobile station (MS) to a base station (BS) is described. Wherein the CPE and the BS are part of a first wireless network based upon a first networking standard, and the MS and the CPE are part of a second wireless network based upon a second networking standard. The method comprising associating the MS with the CPE. The method further comprising indicating to the BS that the CPE is acting as an agent for the MS on the second wireless network. Also comprising acting as an agent, on the second wireless network, for the MS. And comprising, storing context information related to the MS, wherein the context information includes MS context information related the first network and MS context information related the second network.

34 Claims, 15 Drawing Sheets

OTHER PUBLICATIONS

HSC, "Optimized Hard Handover in WiMAX", Retrieved on Apr. 9, 2008 from myhsc.pbwiki.com/Optimized%20Hard%20Handover%20in%20WIMAX, pp. 1-2.

IEEE, "802.11: IEEE Standard for Information Technology—Telecommunications and information exchange between systems—Local and metropolitan area networks—Specific requirements, Part 11: Wireless LAN Medium Access Control (MAC) and Physical Layer (PHY) Specifications", IEEE Computer Society, IEEE Std. 802.11-2007, (Jun. 12, 2007), pp. 1-1232.

IEEE, "Part 16: Air Interface for Fixed and Mobile Broadband Wireless Access Systems; Amendment 2: Physical and Medium Access Control Layers for Combined Fixed and Mobile Operation in Licensed Bands and Corrigendum", IEEE Standard for Local and Metropolitan Area Networks; IEEE Std 802.16e-2005 and IEEE Std 802.16-2004/Cor1-2005, (Feb. 28, 2006), pp. 1-864.

Jain, R., "WiMAX Part III: Mobility and Networking", CSE.com (2008), pp. 1-12.

Koo, C., et al., "Idle handover & location update in 802.16e", IEEE C802.16e-04/28r1, (Mar. 12, 2004), pp. 1-7.

Liu, X. et al., "Example Handover Procedures between 802.11 and 802.16", IEEE 802.21 MIHS (Apr. 29, 2006), 11 pages.

International Search Report and Written Opinion for PCT Application No. PCT/EP2009/055587, mailed on Sep. 30, 2009, 20 pages.

Sauter, M., "802.16 and WiMAX", Communication Systems for the Mobile Information Society, Ch. 5, published by John Wiley & Sons, Ltd. (2006), pp. 249-300.

Wikipedia, "WiMAX", Wikipedia definition, retrieved on Apr. 1, 2008 from en.wikipedia.org/wiki/WiMAX, pp. 1-12.

Office Action received for U.S. Appl. No. 12/118,448, mailed on Oct. 24, 2011, 20 pages.

Restriction Requirement for U.S. Appl. No. 12/118,448, mailed on Jun. 15, 2011, 6 pages.

Response to Restriction Requirement for U.S. Appl. No. 12/118,448, mailed on Jul. 15, 2011, 13 pages.

* cited by examiner

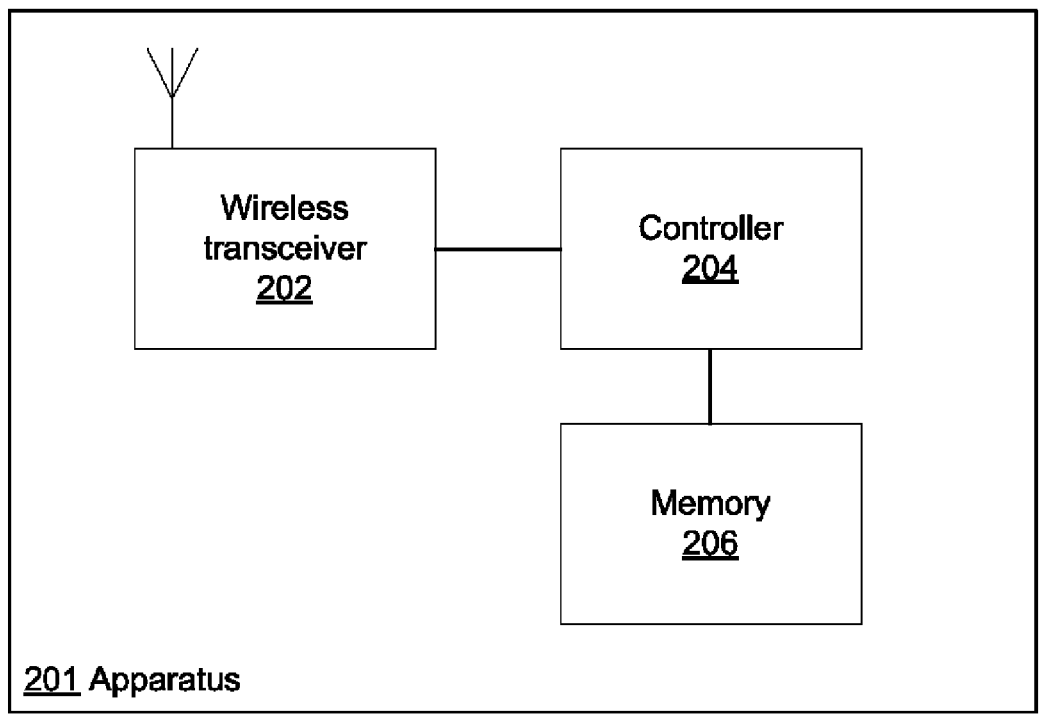
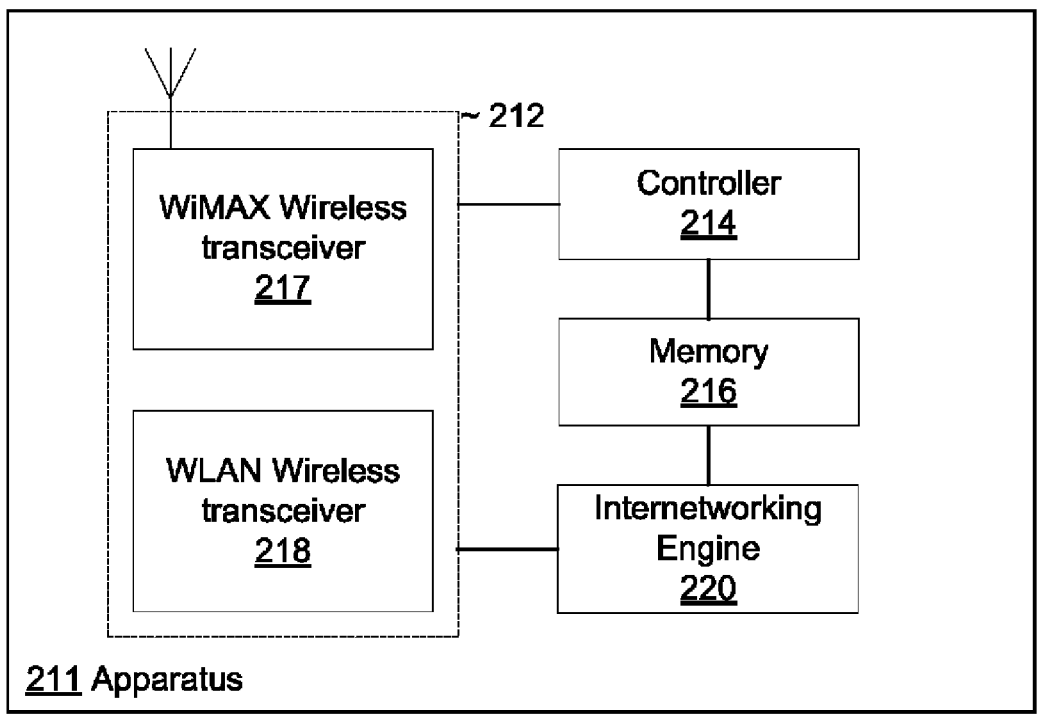
FIG. 2

300

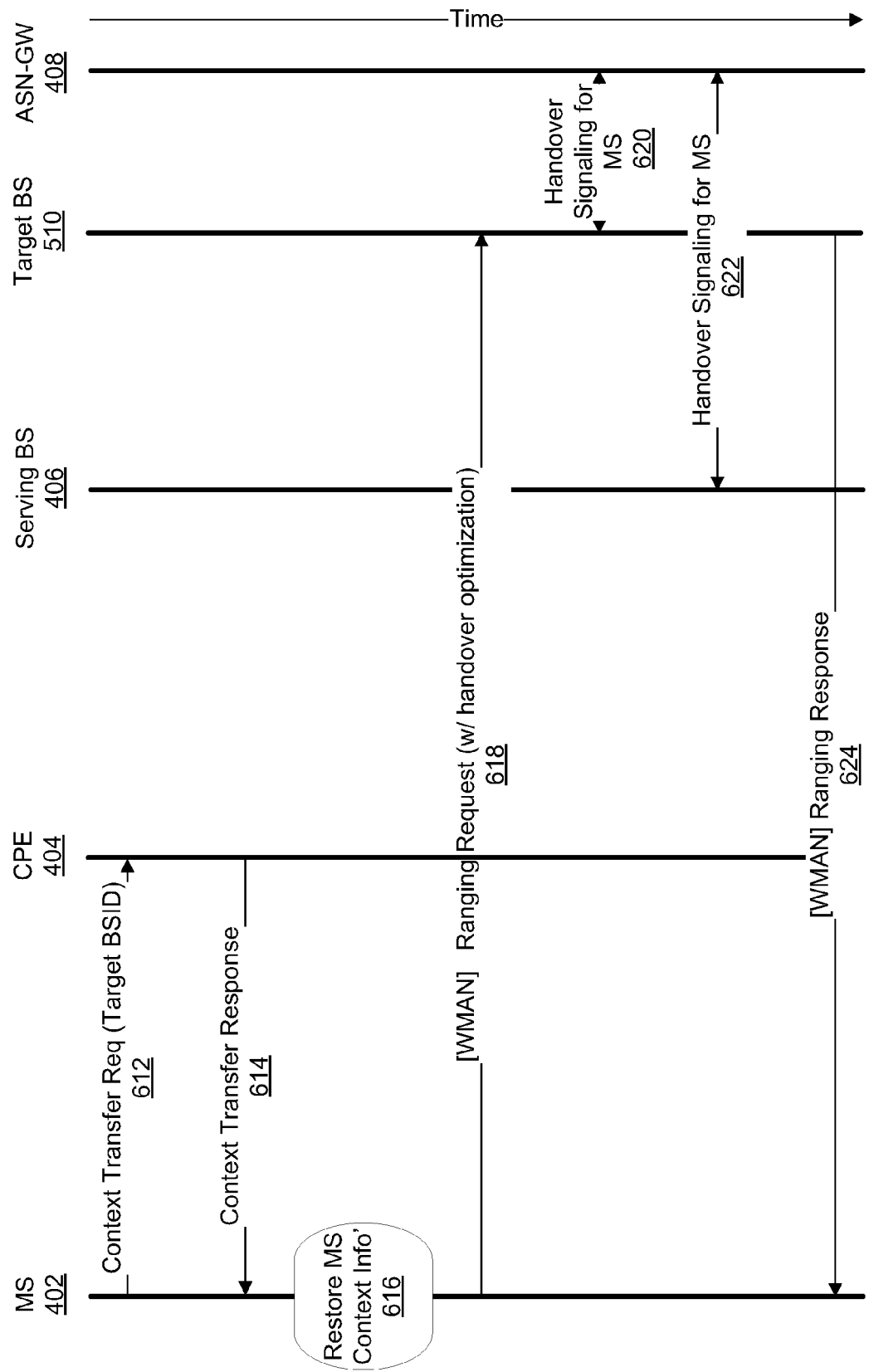

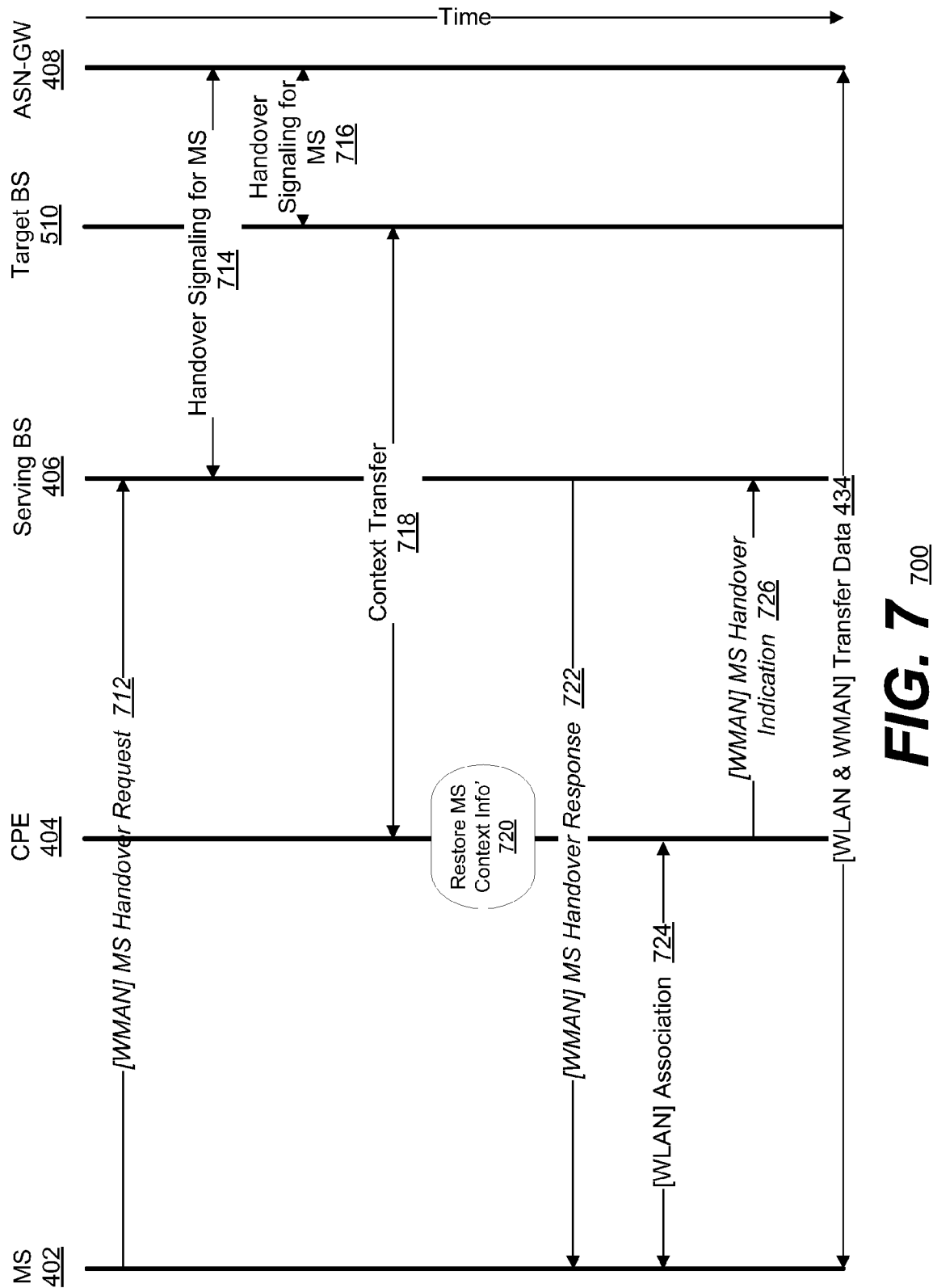

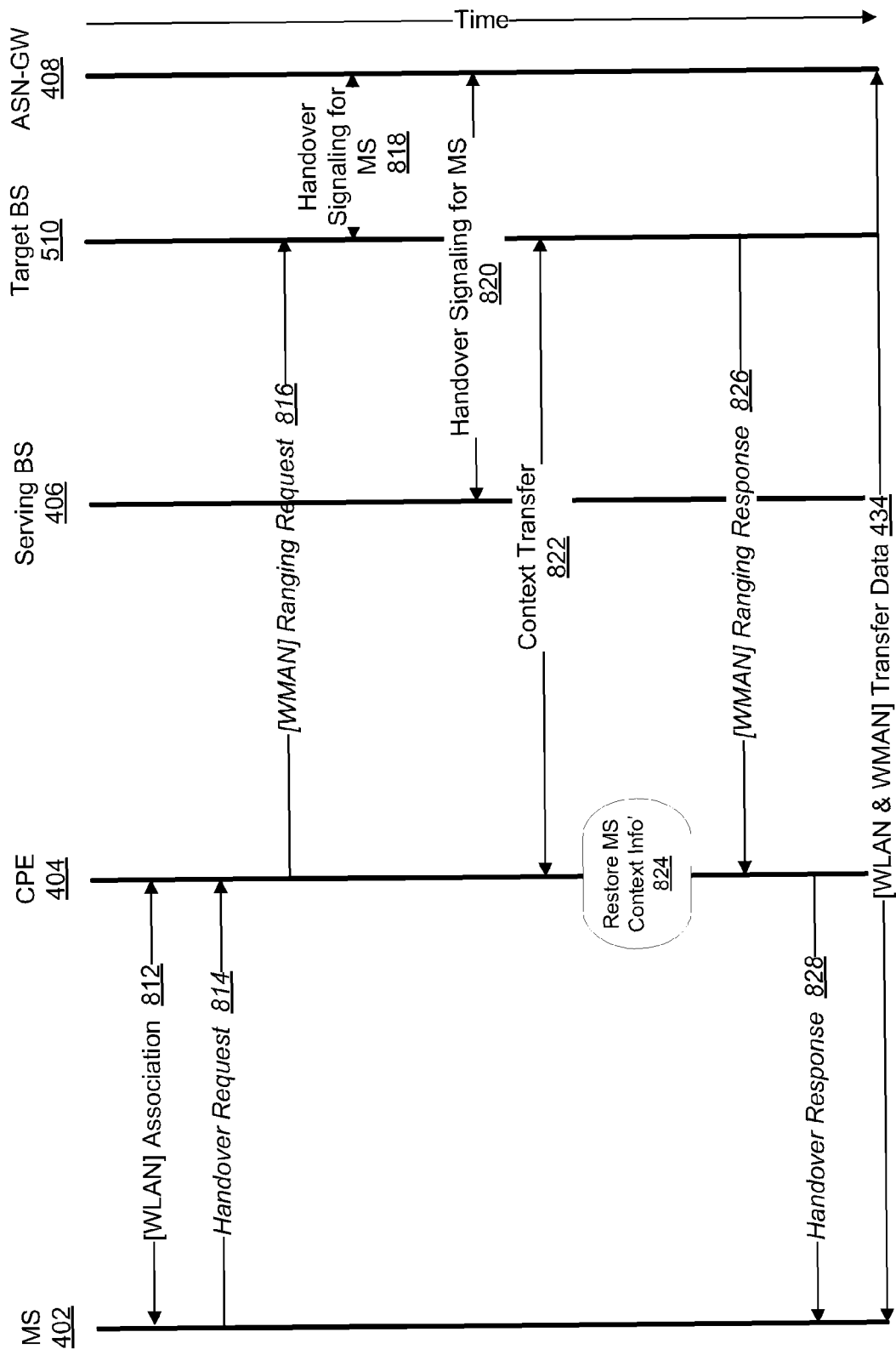

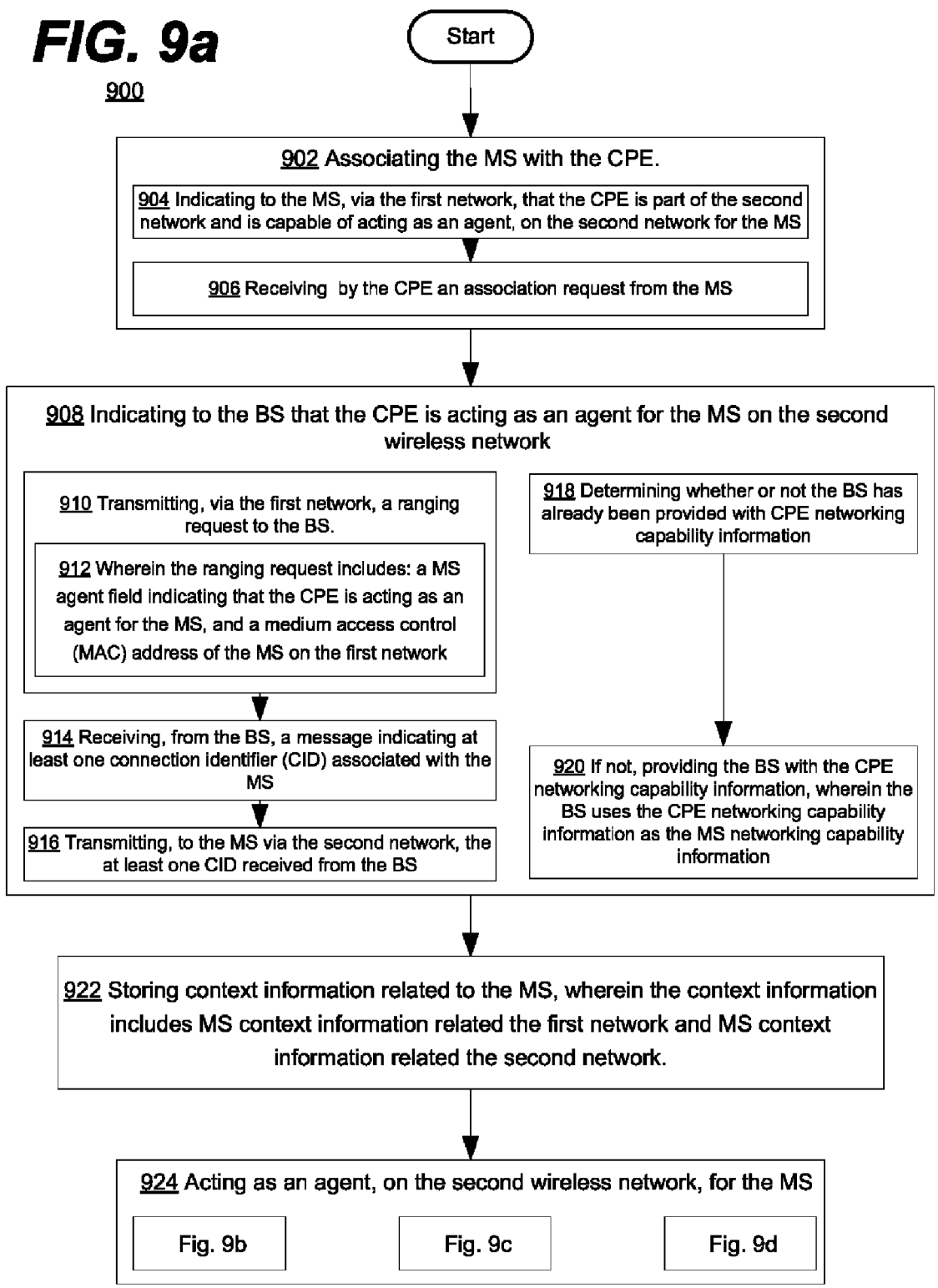

FIG. 9b

924 Acting as an agent, on the second wireless network, for the MS

930 Receiving, via the second wireless network, an authentication procedure message from the MS, wherein the authentication procedure message includes MS security context information based upon the MS's subscription information for the first network

932 Converting the authentication procedure message from the second networking standard to the first networking standard

934 Transmitting, via the first network, the converted authentication procedure message to the BS

935 Encapsulating the second network authentication messages

936 Receiving an authentication key (AK-MS), associated with the MS, and a traffic encryption key (TEK) from the BS

938 Receiving, via the second wireless network, a network address request from the MS

940 Converting the network address request from the second networking standard to the first networking standard

942 Transmitting, via the first wireless network, the converted network address request

944 Receiving a network address associated with the MS

FIG. 9c

924 Acting as an agent, on the second wireless network, for the MS

950 Establishing at least one service flow on the first wireless network for the use of the MS

952 Receiving, via the second network, an add traffic stream (ADDTS) request from the MS indicating that a certain level of quality of service (QoS) should be provided for the transmission of data

↓

954 Converting the ADDTS request to a QoS request for the first network

↓

956 Establishing a service flow using the converted ADDTS request

↓

958 Receiving, from the first network, MS context information associated with the service flow and the MS

↓

960 Converting at least a portion of the received MS context information related the first network to MS context information related the second network

↓

962 Transmitting the MS context information related the second network to the MS, via the second network

FIG. 9d

924 Acting as an agent, on the second wireless network, for the MS

970 Receiving data from the MS, via the second network

972 Converting the received data for transmission via the first network

974 Transmitting the converted data to the BS, via the first network, using a connection identifier (CID) of the MS on the first network

FIG. 10a
1000

Start

↓

1002 Establishing, via a customer premises equipment (CPE), a mobile station (MS) on a wireless local area network (WLAN)

↓

1004 Establishing an agency relationship with the CPE to represent the MS on a wireless metropolitan area network (WMAN)

1006 Wherein the CPE indicates to other devices on the WMAN that the CPE is representing the MS

1008 Wherein the CPE maintains a set of WMAN context information associated with the MS

1010 Wherein the set of WMAN context information associated with the MS includes:
WMAN quality of service information associated with the MS;
WMAN security information associated with the MS;
reported MS WMAN capability information; and
WMAN service flow information associated with the MS

↓

1012 Performing a context transfer from the CPE to the MS, wherein once the handover is complete the MS may represent itself on the WMAN

1014 Requesting that the CPE initiate a transfer of a set of WMAN context information associated with the MS

1016 Transmitting a target BS identifier to the CPE, wherein the target BS identifier indentifies a WMAN base station the MS intends to directly associate with

1018 Causing the CPE to, as an agent of the MS, perform a base station handover on the WMAN, for the benefit of the MS, from a serving BS, associated with the CPE, to the target BS

↓

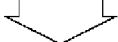
1001

FIG. 10b
1000

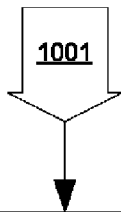
1001

1012 Performing a context transfer from the from the CPE to the MS, wherein once the handover is complete the MS may represent itself on the WMAN

1050 Receiving, from the CPE, the set of WMAN context information associated with the MS

1052 Receiving the set of WMAN context information occurs after the CPE has performed the base station handover

1054 Causing the CPE to, as an agent of the MS, perform a base station handover on the WMAN, for the benefit of the MS, from a serving BS, associated with the CPE, to the target BS

1056 Restoring, within the MS, the set of WMAN context information associated with the MS

1058 Directly communicating via the WMAN without the CPE as an agent.

1060 Transmitting a ranging request to a target BS, wherein the ranging request initiates a mobile station handover from a serving BS that was used by the CPE to the target BS

1062 Wherein the ranging request includes a handover optimization field indicating a handover optimization technique to use; and an identifier indicating the serving BS

1064 Receiving a ranging response indicating the success of the mobile station handover

1066 Initiating a MS capabilities exchange with the target BS to replace a reported set of MS WMAN capabilities, reported by the CPE, with an actual set of MS WMAN capabilities End

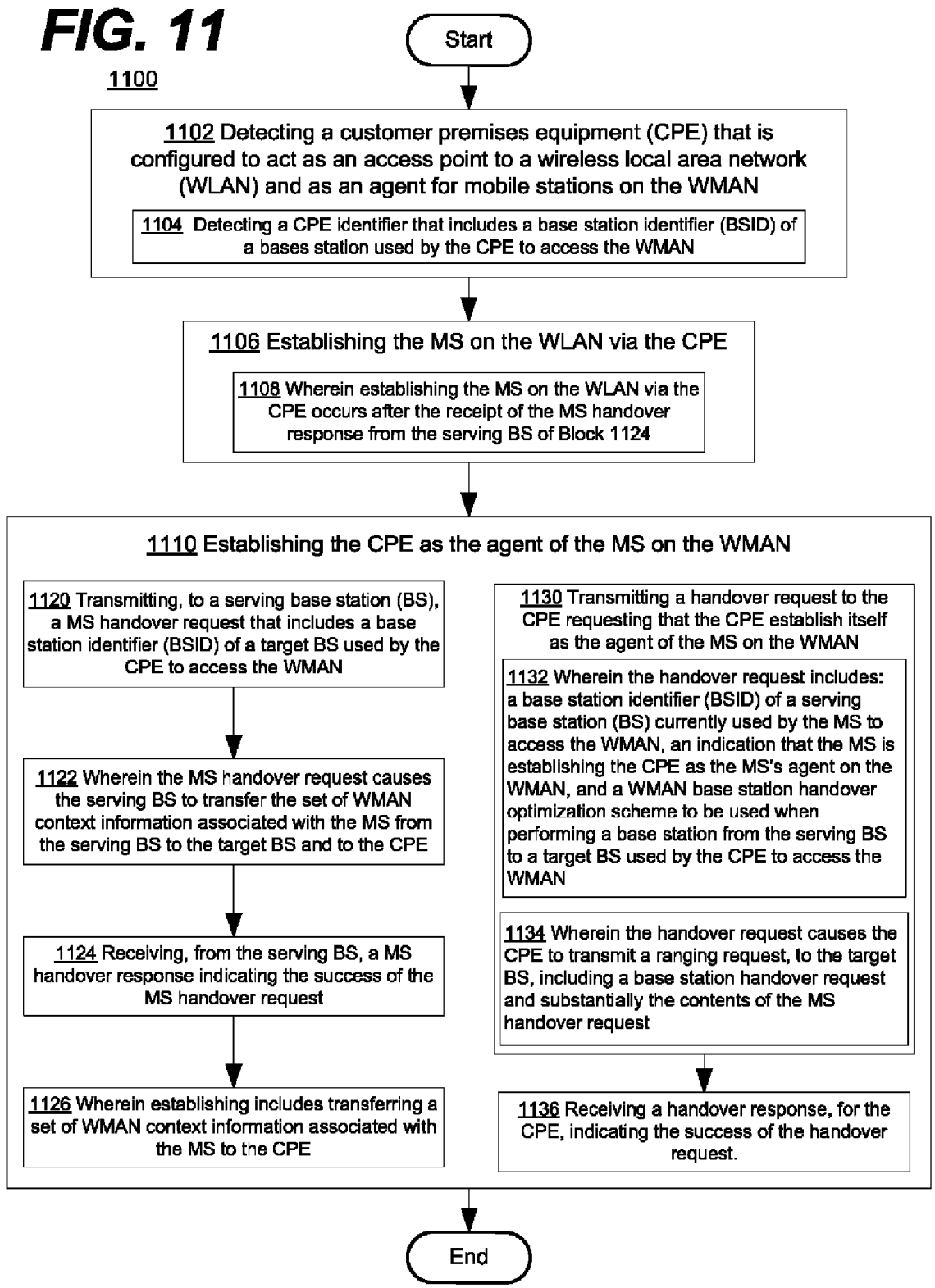

FRAMEWORK FOR INTERNETWORKING BETWEEN WMAN AND WLAN NETWORKS

TECHNICAL FIELD

This description relates to wireless networks.

BACKGROUND

Typically, wireless networks include a base station that generally couples a wired network with a wireless network and mobile station that uses the wireless network. Often these two devices are in direct communication. However, multiple wireless network standards are in use or development. Due to the ranged nature of wireless networks, it is possible that a mobile station may be connected to or in the range of a number of wireless networks.

Worldwide Interoperability for Microwave Access (WiMAX) is a telecommunications technology often aimed at providing wireless data over long distances (e.g., kilometers) in a variety of ways, from point-to-point links to full mobile cellular type access. A network based upon WiMAX is occasionally also called a Wireless Metropolitan Access Network (WirelessMAN or WMAN); although, it is understood that WMANs may include protocols other than WiMAX. WiMAX often includes a network that is substantially in compliance with the IEEE 802.16 standards, their derivatives, or predecessors (hereafter, "the 802.16 standard"). Institute of Electrical and Electronics Engineers, *IEEE Standard for Local and Metropolitan Area Networks, Part 16*, IEEE Std. 802.16-2004.

Wireless Local Area Network (WLAN) is a telecommunications technology often aimed at providing wireless data over shorter distances (e.g., meters or tens of meters) in a variety of ways, from point-to-point links to full mobile cellular type access. A network based upon the WLAN standard is occasionally also referred to by the common or marketing name "WiFi" (or "Wi-Fi") from Wireless Fidelity; although it is understood that WLAN may include other shorter ranged technologies. WiFi often includes a network that is substantially in compliance with the IEEE 802.11 standards, their derivatives, or predecessors (hereafter, "the 802.11 standard"). Institute of Electrical and Electronics Engineers, *IEEE Standard for Information Technology*—Telecommunications and Information Exchange between Systems—Local and Metropolitan Area Network—Specific Requirements—Part 11: *Wireless LAN Medium Access Control (MAC) and Physical Layer (PHY) Specifications*, IEEE Std. 802.11-2007.

SUMMARY

According to one general aspect, a method of using a customer premises equipment (CPE) to represent a mobile station (MS) to a base station (BS) is described. Wherein the CPE and the BS are part of a first wireless network based upon a first networking standard, and the MS and the CPE are part of a second wireless network based upon a second networking standard. The method comprising associating the MS with the CPE. The method further comprising indicating to the BS that the CPE is acting as an agent for the MS on the second wireless network. Also comprising acting as an agent, on the second wireless network, for the MS. And comprising, storing context information related to the MS, wherein the context information includes MS context information related the first network and MS context information related the second network.

According to one general aspect, an apparatus comprising a first wireless transceiver configured to associate the apparatus with a first wireless network based upon a first networking standard, and communicate with a mobile station (MS) that is part of the first network. Further comprising a second wireless transceiver configured to associate the apparatus with a second wireless network based upon a second networking standard, and communicate with a base station (BS) that is part of the second network. Also comprising an interworking engine configured to convert communications from the first networking standard to the second networking standard and vice versa. Still comprising a controller configured to communicatively couple the MS with the second network, and act as an agent for the MS on the second network such that an accounting may be made of the activities of the MS on the second network. And comprising a memory configured to store context information related to the MS, wherein the context information includes MS context information related the first network and MS context information related the second network.

According to one general aspect, a method of using a mobile station comprising establishing, via a customer premises equipment (CPE), a mobile station (MS) on a wireless local area network (WLAN). Further compositing establishing an agency relationship with the CPE to represent the MS on a wireless metropolitan area network (WMAN). Wherein the CPE indicates to other devices on the WMAN that the CPE is representing the MS, and wherein the CPE maintains a set of WMAN context information associated with the MS. And comprising, performing a handover from the CPE to the BS in the WMAN, wherein once the handover is complete the MS may represent itself on the WMAN.

According to one general aspect, a method of using a mobile station (MS) that is established on a wireless metropolitan area network (WMAN) comprising detecting a customer premises equipment (CPE) that is configured to act as an access point to a wireless local area network (WLAN) and as an agent for mobile stations on the WMAN. Further comprising establishing the MS on the WLAN via the CPE. And comprising establishing the CPE as the agent of the MS on the WMAN. Wherein establishing includes transferring a set of WMAN context information associated with the MS to the CPE.

The details of one or more implementations are set forth in the accompanying drawings and the description below. Other features will be apparent from the description and drawings, and from the claims.

BRIEF DESCRIPTION OF THE DRAWINGS

FIG. 2 is a block diagram of two wireless devices in accordance with an example embodiment of the disclosed subject matter.

FIG. 6 is a timing diagram of a wireless network in accordance with an example embodiment of the disclosed subject matter.

FIG. 7 is a timing diagram of a wireless network in accordance with an example embodiment of the disclosed subject matter.

FIG. 8 is a timing diagram of a wireless network in accordance with an example embodiment of the disclosed subject matter.

FIG. 9 is a flowchart of a technique in accordance with an example embodiment of the disclosed subject matter.

FIG. 10 is a flowchart of a technique in accordance with an example embodiment of the disclosed subject matter.

FIG. 11 is a flowchart of a technique in accordance with an example embodiment of the disclosed subject matter.

DETAILED DESCRIPTION

Figure 1:
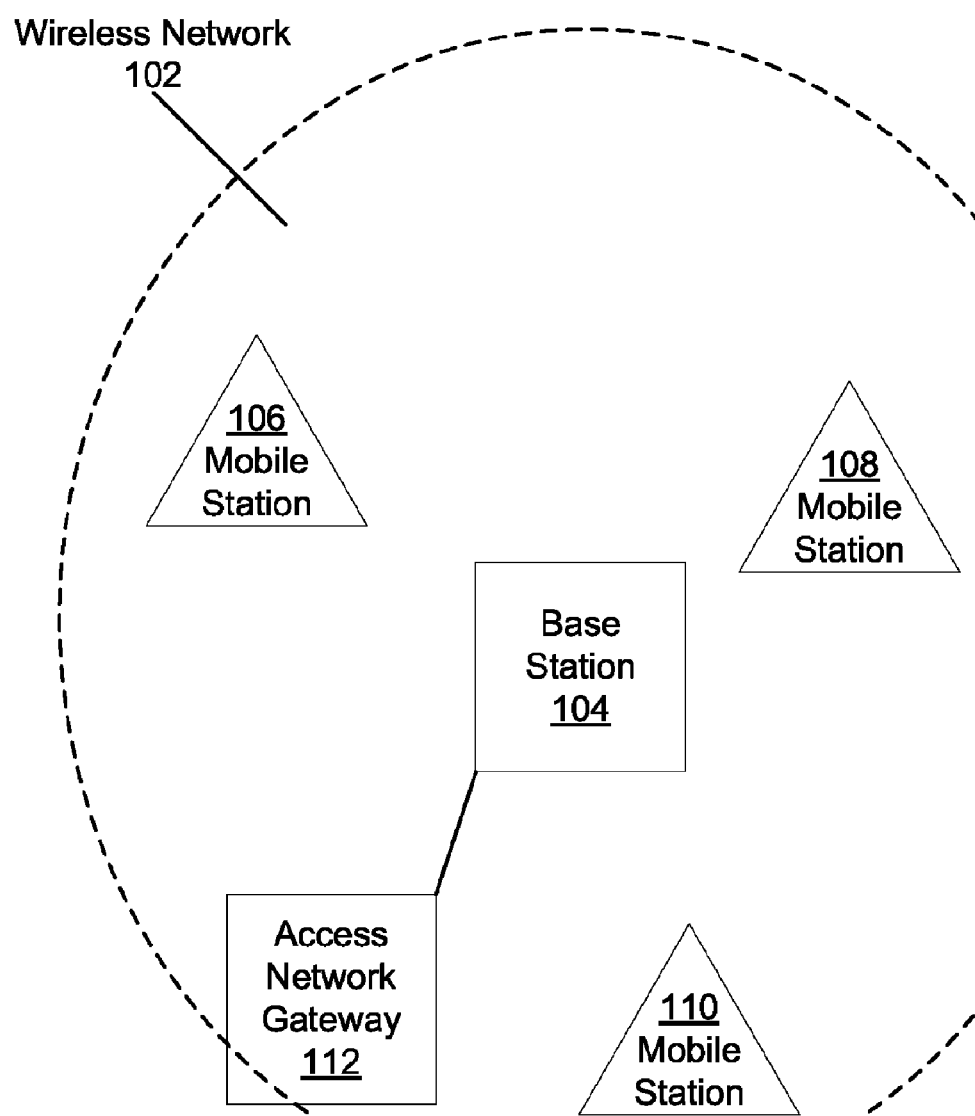
FIG. 1 is a block diagram of a wireless network in accordance with an example embodiment of the disclosed subject matter.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink direction to BS 104, and may receive data in a downlink direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network (not shown), such as a Local Area Network, a Wide Area Network (WAN), the Internet, etc. In various embodiments, the base station 104 may be coupled or connected with the other network 120 via an access network controller (ASN) or gateway (GW) 112 that may control, monitor, or limit access to the other network.

FIG. 2 is a block diagram of a wireless device 201 in accordance with an example embodiment of the disclosed subject matter. In one embodiment, the wireless device 201 may include a base station such as illustrated in FIG. 1. In another embodiment, the wireless device 201 may include a mobile station such as those illustrated in FIG. 1. In one embodiment, the wireless device 201 may include a wireless transceiver 202, a controller 204, and a memory 206. In various embodiments, the controller 204 may include a processor. In various embodiments, the transceiver 202 may be configured to communicate via at least one networking standard (e.g., WiFi and WiMAX). For example, some operations illustrated and/or described herein, may be performed by a controller 204, under control of software or firmware.

FIG. 2 is also a block diagram of a wireless device 211 in accordance with an example embodiment of the disclosed subject matter. In one embodiment, the wireless device 211 may include a customer premises equipment (CPE) or a mobile station (MS) such as that illustrated in FIG. 3. In one embodiment, the wireless device 211 may include a wireless transceiver 212, a controller 214, an interworking engine 220, and a memory 216. In some embodiments, the transceiver 212 may include a first wireless transceiver 217 configured to operate based upon a first wireless networking standard (e.g., WiMAX, in one embodiment). In some embodiments, the transceiver 212 may also include a second wireless transceiver 218 configured to operate based upon a second wireless networking standard (e.g., WLAN, in one embodiment). In various embodiments, the controller 214 may include a processor. For example, some operations illustrated and/or described herein, may be performed by a controller 214, under control of software or firmware.

Figure 3:
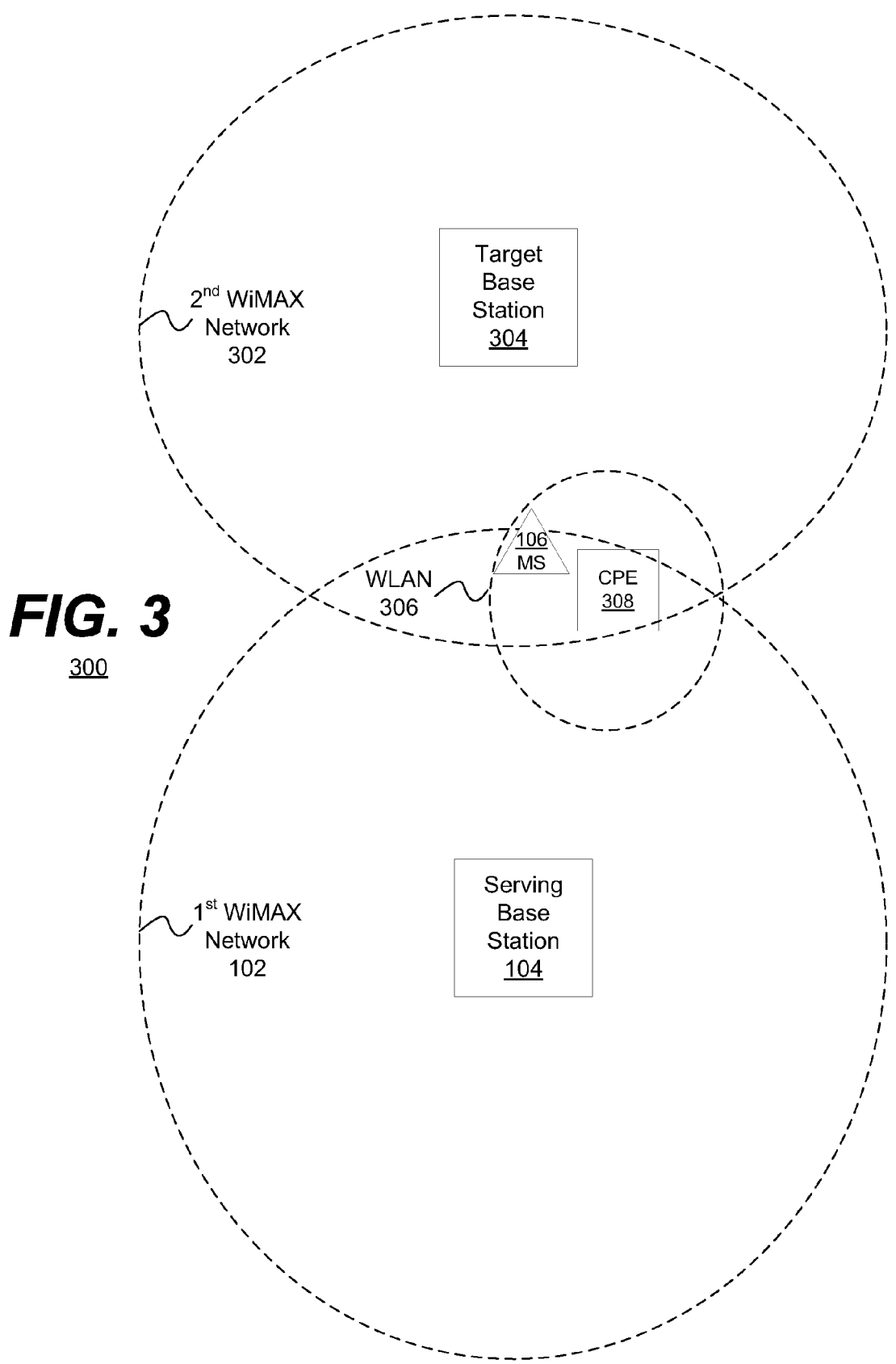
FIG. 3 is a block diagram of a wireless system in accordance with an example embodiment of the disclosed subject matter.

FIG. 3 is a block diagram of a wireless system 300 in accordance with an example embodiment of the disclosed subject matter. In one embodiment, the system 300 may include a first network 102 based upon a first networking standard, a second network 302 based upon the first networking standard, and a third network 306 based upon a second wireless networking standard. In one embodiment, the first standard may include the WiMAX standard. In one embodiment, the second standard may include the WLAN standard.

In one embodiment, the system 300 may include a mobile station (MS) 106. In one embodiment, the MS 106 may be connected or associated with the first network 102 via the base station (BS) 104. The first network 102 may have a relatively large expected wireless signal range, such as greater than one kilometer.

In such an embodiment, as a larger network the first network 102 may encompass or substantially overlap with the third network (hereafter, "WLAN") 306. The WLAN 306 may include a relatively short expected wireless signal range, such as less than one kilometer. In some embodiments, the expected range may be tens of meters (e.g., an expected indoor range of ~40 meters for the IEEE 802.11g standard) or a few hundred meters (e.g., an expected outdoor range of ~250 meters for IEEE 802.11n standard). It is understood that the above are merely a few illustrative examples to which the disclosed subject matter is not limited.

In such an embodiment, the MS 106 may be in range of both the first network 102 and the WLAN 306. In one embodiment, the MS 106 may decide to couple or connect with both networks. In another embodiment, the MS 106 may select which of the two networks to be actively coupled with.

In one embodiment, the MS 106 may be coupled with the first network 102 via the BS 104. In the same embodiment, the MS 106 may be coupled with the WLAN 306 via a customer premises equipment (CPE) 308. In one embodiment, the CPE 308 may transmit data to and from the MS and be coupled via wired or wireless links to another network (not shown), such as a Local Area Network, a Wide Area Network (WAN), the Internet, etc. It is understood that, in various embodiments, as the CPE 308 and BS 104 may communicate with the MS 106 using different networking standards and, therefore, their specific interactions with the MS 106 may differ.

In one embodiment, while the WiMAX network 102 may provide a larger radio coverage for mobile or nomadic users the WLAN 306 may provide better throughput. Therefore, in one embodiment, the MS 106 may prefer to use the WLAN 306 when it is within range; although the disclosed subject matter is not limited to any one motive. The process of switching or transferring from a first network or base station to another network or base station may be known as a "handover".

In one embodiment, the MS 106 may perform a handover from the first WiMAX network 102 to the WLAN 306 when the MS 106 comes within range of the WLAN 306. In some embodiments, this handover may be automatic. In another embodiment, the handover may include manual initiation or approval. It is understood that, while the first and second networks 102 and 302 may be referred to as WiMAX networks and the third network 306 referred to as a WLAN or Wi-Fi network for the sake of readability, the disclosed subject matter is not limited to any particular protocols and that the preferred or described embodiments are not the only possible embodiments.

In one embodiment, the handover may not include totally severing the association between the MS 106 and first WiMAX network 102. For example, in one embodiment, the CPE 308 may act as an agent for the MS 106 on the WiMAX network 102. In such an embodiment, the MS 106 may use the CPE 308 as an access point (AP) while it is coupled with the WLAN 306 and also use the CPE 308 as a gateway or agent when communicating via the WiMAX network 102.

In one embodiment, the relationship between the MS 106 and the BS 104 may include storing a significant amount of information by the BS 104. In one embodiment, the BS 104 may store information relating to the capabilities of the MS 106. Such capabilities may include the data rate and protocol support provided by the MS 106. In another embodiment, the BS 104 may store information related to the service flows used by the MS 106.

In one embodiment, a service flow may include a unidirectional flow of medium access control (MAC) service data units (SDUs) on a connection that is provided a particular quality of service (QoS). Such service flow information, in one embodiment, may include QoS information, a service flow identifier (SFID) that identifies the service flow, security information or security associations (SAs) including cryptographic keys, etc. The information may also include the connection identifier (CID) associated with the MS 106. In one embodiment, the CID may include a 16-bit value that identifies a connection between the BS and MS, in one embodiment, at the MAC level, and may be used to map a service flow or SAs to the MS 106. In one embodiment, this information may be referred to as context information.

As described above, when the MS 106 hands-over from the WiMAX network 102 to the WLAN 306, the MS 106 may instruct or request that the CPE 308 maintain a certain amount of context information to facilitate representing the MS 106 back to the WiMAX network 102. In one embodiment, this information may be transferred, in whole or part, from the MS 106 to the CPE 308 as the MS 106 enters the WLAN 306. In another embodiment, the context information and other data may be derived or transferred when the MS 106 first wishes to communicate via the WiMAX network 102 while being coupled with the WLAN 306.

In one embodiment, the CPE 308 may act as the agent for the MS 106 on the WiMAX network 102. In such an embodiment, the MS 106 may transmit data to the CPE 308, which is then relayed by the CPE 308 to the BS 104. In various embodiments, the CPE 308 may inform the BS 104 that the CPE 308 is acting as the agent of the MS 106. As data is forwarded from the CPE 308 to the BS 104, the data may be forwarded in such a way as to identify the communication with the MS 106. The reverse may occur as data is received. Data may be sent for the MS 106 and routed through the CPE 308 to the MS 106.

This is compared to other possible embodiments, in which the CPE 308 is acting as a substitute or proxy as opposed to an agent. In such an embodiment, the data may be communicated in such a way that it appears to only be from or to the CPE 308. In one embodiment, where the CPE 308 is acting as an agent, the above transparency of communication may allow pass-through billing and accounting (of e.g., money, bandwidth, monthly data limits, etc.) or other forms of management of the MS 106 that may be obscured in embodiments where the CPE 308 acts as a substitute or proxy. Although, it is understood that the above are merely a few illustrative examples to which the disclosed subject matter is not limited.

In various embodiments, the CPE 308 may act as a WiMAX agent for multiple MSs (not shown). For each MS associated with it via the WLAN 306 interface, the CPE 308 may, in one embodiment, generates a full set of WiMAX context information. In various embodiments, the MS's context information may be established via the WiMAX procedures such as ranging, capability exchange, authentication and key distribution, registration, IP configuration and initial service flow setup, as described above. In such an embodiment, the sets of context information may be maintained by the CPE 308 until the respective MSs handover to another base station or otherwise leave the WiMAX network.

In various embodiments, the MS 106 may not be aware of these procedures and the CPE 308 may perform them on behalf of the MS 106, using MS's Medium Access Control (MAC) address. In one embodiment, the MS 106 may also not be aware of its WiMAX context except a small set of a security related context, which is used to interwork with the security procedure over the WLAN interface. Using this approach, the WiMAX context information for the MS 106 may always, in one embodiment, be maintained in the WiMAX network 102 even when the MS 106 accesses the WiMAX network 102 via the CPE 308. Therefore, handover between WLAN 306 and WiMAX network 102 may, in such an embodiment, simply be viewed as an inter and intra BS handover. In such an embodiment, the handover latency can be significantly reduced.

In various embodiments, once the MS 106 has left the range of the WLAN 306, or for other reasons, the MS 106 may re-enter the WiMAX network 102. In one embodiment, the context information stored by the CPE 308 may be returned to the MS 106 and used to make the re-entry as seamless as possible. In one embodiment, the re-entry may occur automatically or with manual intervention.

In another embodiment, the MS 106 may move, physically or contextually, from the WLAN 306 to a second WiMAX network 302. In such an embodiment, the MS 106 may attempt to perform a hand-over the serving BS 104 to the target BS 304. In various embodiments, this may involve de-authorizing the CPE 308 as the agent of the MS 106, and the MS 106 becoming a device on the second WiMAX network 320 on its own right. The BS 304 of the WiMAX network 302 may not include the context information needed to facilitate a seamless or near-seamless hand-over from the first WiMAX network 102 to a second WiMAX network 302. In one embodiment, the WiMAX network 302 may simply start from scratch and create a whole new set of context information for the MS 106. In another embodiment, the BS 304 may request or obtain the context information related to the MS 106 from, directly or indirectly, the BS 104.

Figure 4:
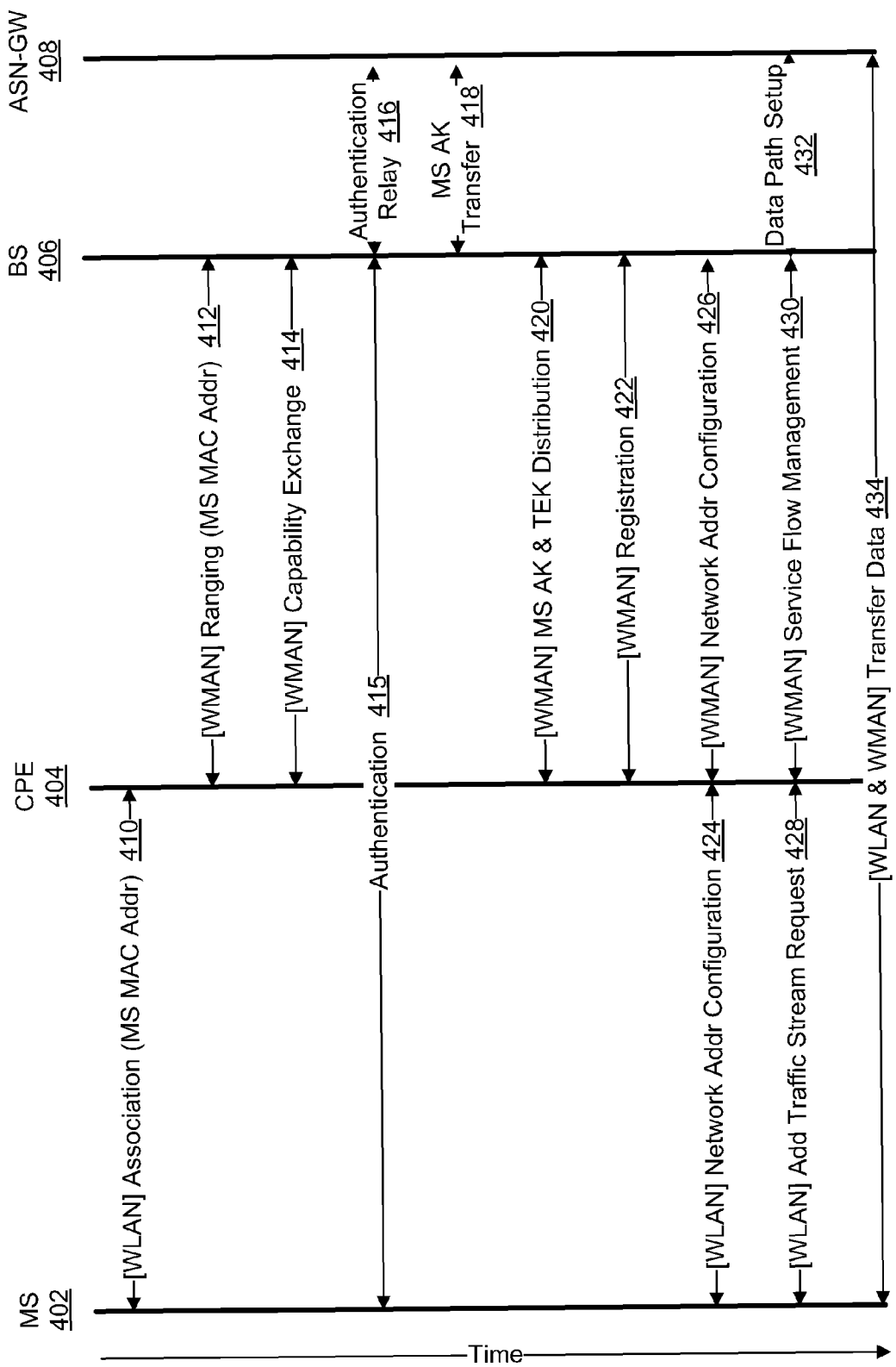
FIG. 4 is a timing diagram of a wireless network in accordance with an example embodiment of the disclosed subject matter.

FIG. 4 is a timing diagram of a wireless network in accordance with an example embodiment of the disclosed subject matter. In one embodiment, the timing diagram may illustrate an establishment of the CPE 404 as the representative or agent of the MS 402 on a WiMAX network or more generally of an agent apparatus on a first network for a client apparatus that exists on a second network. In various embodiments, the timing diagram 400 may include the use of a system that includes a MS 402, a customer premises equipment (CPE) 404, a access system network gateway (ASN-GW) 408, and a BS 406. In one embodiment, these devices may be illustrated in FIGS. 1 and 3.

Prior to the timing diagram illustrated in FIG. 4 the CPE 404 may enter or establish itself on the WiMAX network. In one embodiment, after power on, the CPE 404 may perform its network entry procedure as a regular WiMAX station. As such, in one embodiment, it may be assigned a basic connection identifier (CID), primary management CID and secondary CID. The BS 406 and the CPE 404 may also, in one embodiment, exchange their capability information. The BS 406, in one embodiment, may also generate a traffic encryption key (TEK) for the CPE (TEK-CPE). This TEK-CPE may, in one embodiment, be distributed to the CPE 404. An Initial Service Flow (CPE-ISF) may also be generated, in one embodiment, via the WiMAX Dynamic Service Addition (DSA) procedure. In various embodiments, no other service flow may be required for the CPE 404.

In the illustrated embodiment, the MS 402 may not be associated with the WiMAX network. In such an embodiment, the MS 402 may initially become associated with the WLAN. Action 410 illustrates that, in one embodiment, the MS 402 may perform the WLAN association with the CPE 404. In one embodiment, as part of the association the MS 402 may provide the CPE 404 with the MAC address of the MS 402.

In one embodiment, the MS 404 may detect the subscriber station identifier (SSID) of the CPE 406. In one embodiment, the SSID may indicate that the CPE 406 provides multi-host support. In this context "multi-host" may refer to the ability to host multiple network types or protocols (e.g., WLAN and WiMAX). In some embodiments, only a MS that desires to access the WiMAX network using the MS's WiMAX subscription via the WLAN may associate with the CPE 406 over the specified SSID. In another embodiment, any MS may attempt to associate with the CPE 406, but for those MSs without proper WiMAX credentials, the WiMAX network (e.g., the BS 406) may reject the service after the authentication procedure, as described below.

Action 412 illustrates that, in one embodiment, the CPE 404 may establish the MS 402 on the WiMAX network via the CPE 404 as agent. In one embodiment, the CPE 404 may generate a ranging request (RNG-REQ). In one embodiment, the RNG-REQ 412 or similar message may be a Medium Access Control (MAC) management message. In such an embodiment, a RNG-REQ may be transmitted from the CPE 404 to, in part, determine the network delay and to request power and/or downlink burst profile changes. In one embodiment, the RNG-REQ may include a MS MAC address field. In some embodiments (e.g., a WiMAX embodiment) this field may be known as a Type/Length/Value (TLV). In various embodiments, the TLV may include a formatting scheme for passing variable fields and values using messages.

In one embodiment, the MAC address in the RNG-REQ may include the MAC address of the MS 402. In various embodiments, a field or TLV indicating that the MS 402 is using a multi-host service (e.g., the CPE 404) may be included within the RNG-REQ. In another embodiment, the MAC address of the CPE 404 may be included in the RNG-REQ.

Action 412 also illustrates that, in one embodiment, after receiving the RNG-REQ from the CPE 404, the BS 406 may send a ranging response (RNG-RSP) to the CPE 404. In one embodiment, this RNG-RSP may include newly assigned basic, primary management and secondary CIDs. In one embodiment, the RNG-RSP may trigger the CPE 404 to send a WLAN association response back to the MS 402 (illustrated as part of Action 410).

Action 414 illustrates that, in one embodiment, the CPE 404 may perform capability exchange with BS 406. This exchange may be for the MS 402 and using the basic CID of the MS 402. In some embodiments, the capabilities transmitted or reported to the BS 406 may include the capabilities of the agent CPE 404, instead of the actual capabilities of the MS 402. In other embodiments, the reported capabilities may be the lowest common denominator of the CPE 404 and MS 402 capabilities. In another embodiment, since the reported MS 402 capabilities may be based on the capabilities of the CPE 404, Action 414 may be omitted for the particular MS 402, if the CPE 404 has previously reported the CPE 404 capabilities to the BS 406. In such an embodiment, the BS 406 may just assume that the MS 402 has the same capability as the previously reported CPE 404.

Action 415 illustrates that, in one embodiment, the MS 402 may authenticates itself, via its agent the CPE 404, on the WiMAX network. In one embodiment, the MS 402 may initiate the authentication procedure. The MS 402 may create a security context (or set of security context information) based upon the MS's WiMAX subscription. Various embodiments may be used to perform the WiMAX authentication over the heterogeneous WLAN and WiMAX interfaces.

In one embodiment, the MS 402 and CPE 404 may communicate over the WLAN using Extensible Authentication Protocol (EAP) over LANs (EAPOL). In one embodiment, EAP may include a universal authentication framework frequently used in wireless networks and Point-to-Point connections. In one embodiment, the CPE 404 may then encapsulate or convert these EAP authentication messages to a standard suitable for the WiMAX network. In one embodiment, the Privacy and Key Management (PKM) protocol may be used on the WiMAX network (e.g., PKM version 2). In one embodiment, the CPE 404 and the BS 406 may use PKM to authenticate the MS 402 on the WiMAX network. As previously discussed, the CPE 404 may provide interworking support (e.g., encapsulation or more often in some embodiments conversion) between these two protocols.

In another embodiment, the MS 402 may generate PKM messages and transmit them to the CPE 404 via the WLAN interface as user traffic. In one embodiment, the CPE 404 may check and verify the received WLAN user traffic and disregard all other traffic (related to this MS 402) except the PKM messages. This selective filtering may occur until the MS 402 is properly authenticated. In such an embodiment, the CPE 404 may then forward the received PKM messages to the BS 406 using the WMAN protocol. For example, in a specific embodiment, the CPE 404 may use WiMAX packet data units (PDUs) that include the primary management CID of the MS 402 when transmitting to the BS 406.

In yet another embodiment, the MS 402 may generate PKM messages and transfer them to the CPE 404 using the WLAN interface, as described above. However, in this embodiment, the transmissions may use a specific frame type or other identifier that identifies the transmissions as authentication based. In such an embodiment, the CPE 404 may disregard all other traffic (related to this MS 402) that does not include the specific frame type. As described above, the CPE 404 may then forward this authentication information to the BS 406.

Action 416 illustrates that, in one embodiment, after receiving the authentication messages from the MS 402 (via the CPE 404), the BS 406 may relay the authentication messages to the ASN-GW 408. In some embodiments, the ASN-GW 408 may perform the authentication of the MS 402 onto the WiMAX network. Although in other embodiments other authentication schemes may be used.

Action 418 illustrates that, in one embodiment, after the MS 402 is successfully authenticated by the WiMAX network, the ASN-GW 408 may generate an Access Key (AK) for the MS 402 (AK-MS). In one embodiment, this AK-MS may be distributed to the BS 406. In one embodiment, the MS 402 may also derive its own AK (not illustrated).

Action 420 illustrates that, in one embodiment, the BS 406 may distribute the AK-MS. In one embodiment, the BS 406 may distribute the AK-MS to the CPE 404 as defined in the WiMAX standard; although, it is understood that other distribution schemes may be used. In one embodiment, the BS 406 may also generate a traffic encryption key (TEK) for the MS 402 (TEK-MS) and distribute it to the CPE 404.

In one embodiment, the TEK-MS may be used to encrypt/decrypt user traffic between the CPE 404 and the BS 406 for the MS 402. In such an embodiment, the CPE 404 may classify user traffic related to the different MSs connected to the WiMAX network via the CPE 404 (of which MS 402 is one). Once classified, the CPE 404 may select the respective TEK-MS to encrypt/decrypt the user traffic with the BS 406.

In another embodiment, the TEK-CPE (assigned prior to the time line of FIG. 4, as described above) may be used to encrypt/decrypt user traffic between the CPE 404 and the BS 406 for the MS 402. In such an embodiment, the CPE 404 may use a single key to encrypt/decrypt user traffic related to the different MSs connected to the WiMAX network via the CPE 404 (of which MS 402 is one). In such an embodiment, the TEK-MS may be distributed to the CPE 404 and stored for future use during a handover, as described below in reference to FIGS. 5 and 6.

Action 422 illustrates that, in one embodiment, the CPE 404 may perform registration with the BS 406 on behalf of the MS 402. In one embodiment, registration may include the formation of a secondary management channel for the use of the MS 402. In some embodiments, this action can be omitted and the BS 406 may assume the MS 402 has the same capability as the CPE 404.

Action 424 illustrates that, in one embodiment, the MS 402 may obtain a network address (e.g., an Internet Protocol (IP) address). In one embodiment, the network address configuration messages may be relayed between the MS 402 and the CPE 404 over the WLAN as user plane traffic. In one embodiment, the CPE, at this stage, may classify any traffic received from the MS 402 and disregard any traffic not related to the network address configuration. In one embodiment, Dynamic Host Configuration Protocol (DHCP) may be used. In one such embodiment, DHCP may include a protocol used by networked devices to obtain various parameters necessary for the clients to operate in an Internet Protocol (IP) network.

Action 426 illustrates that, in one embodiment, the CPE 404 may encapsulate the network address configuration messages over the WLAN protocol and the WiMAX protocol (or vice versa). In one embodiment, the network configuration message may be sent using an Initial Service Flow (ISF) for the CPE 404. In another embodiment, an ISF for the MS 402 may be established after its registration. The network configuration messages may then, in such an embodiment, use the MS 402's ISF.

Action 428 illustrates that, in one embodiment, the MS 402 may establish various service flows and data paths in order to communicate over the WiMAX network. In one embodiment, in order to schedule user traffic over the WiMAX network, service flows representing QoS requirements, etc., as described above, may be established. However, the WLAN protocol may not include the concept of service flows. Action 428 illustrates that, in one embodiment, the MS 402 may request to the CPE 404 that certain communication channels be created. In one embodiment, the MS 402 may do this by the use of an add data stream request (ADDTS). In such an embodiment, the ADDTS may be a WiFi MAC management control message that includes a quality of service request and other traffic requirements or specifications.

Action 430 illustrates that, in one embodiment, the CPE 404 may convert this add data stream request (or equivalent depending on the WLAN standard) to a WiMAX service flow management message. Various example service flow management messages may include, in the WiMAX protocol, the Dynamic Service Addition Request (DSA-REQ), Dynamic Service Change Request (DSC-REQ), Dynamic Service Deletion Request (DSD-REQ), and their respective responses.

In various embodiments, the WLAN and WiMAX network protocols may not provide one-to-one equivalents such that protocol translation is not straight forward. In such an embodiment, the CPE 404 may configured to use "gap fillers", default values, rule based values, or approximations, etc. to convert protocol messages between one protocol to the other.

Action 432 illustrates that, in one embodiment, once the service flows have been established, the BS 406 may configure any needed or desired data paths with the ASN-GW 408. In one embodiment, the data paths may include data routing, tunneling information, and other associated information used by the MS 402 to communicate with devices within and without the WiMAX network. Such data paths may exist between the BS 406 and an Access Network Gateway 408 as shown in FIG. 1.

Action 434 illustrates that, in one embodiment, once the service flows and data paths have been established, the MS 402 may communicate with other devices using the WiMAX network. In one embodiment, data communication between the MS 402 and the CPE 404 may use the WLAN networking standard. The CPE 404 may, in one embodiment, interwork the received data to the WiMAX standard. In one embodiment, this interworking may include encapsulation or conversion. In one embodiment, in the case of data, the CPE 404 may simply remove the WLAN MAC PDU header and add a WiMAX MAC PDU header to the data before forwarding the data, or vice versa. In various embodiments, these data may be transmitted such that they are identifiable to the MS 402 (e.g., via CIDs assigned to the MS 402, etc.).

In various embodiments, not all data communications to/from the MS 402 may eventually make use of the WiMAX network. It is understood that there may be a number of communications that occur via the WLAN. For example, communications between the MS 402 and another device on the WLAN may not need, in one embodiment, to make use of the WiMAX and the CPE 404 interworking capability. Such communications may occur solely within the WLAN domain. Although, it is understood that the above are merely a few illustrative examples to which the disclosed subject matter is not limited.

Figure 5:
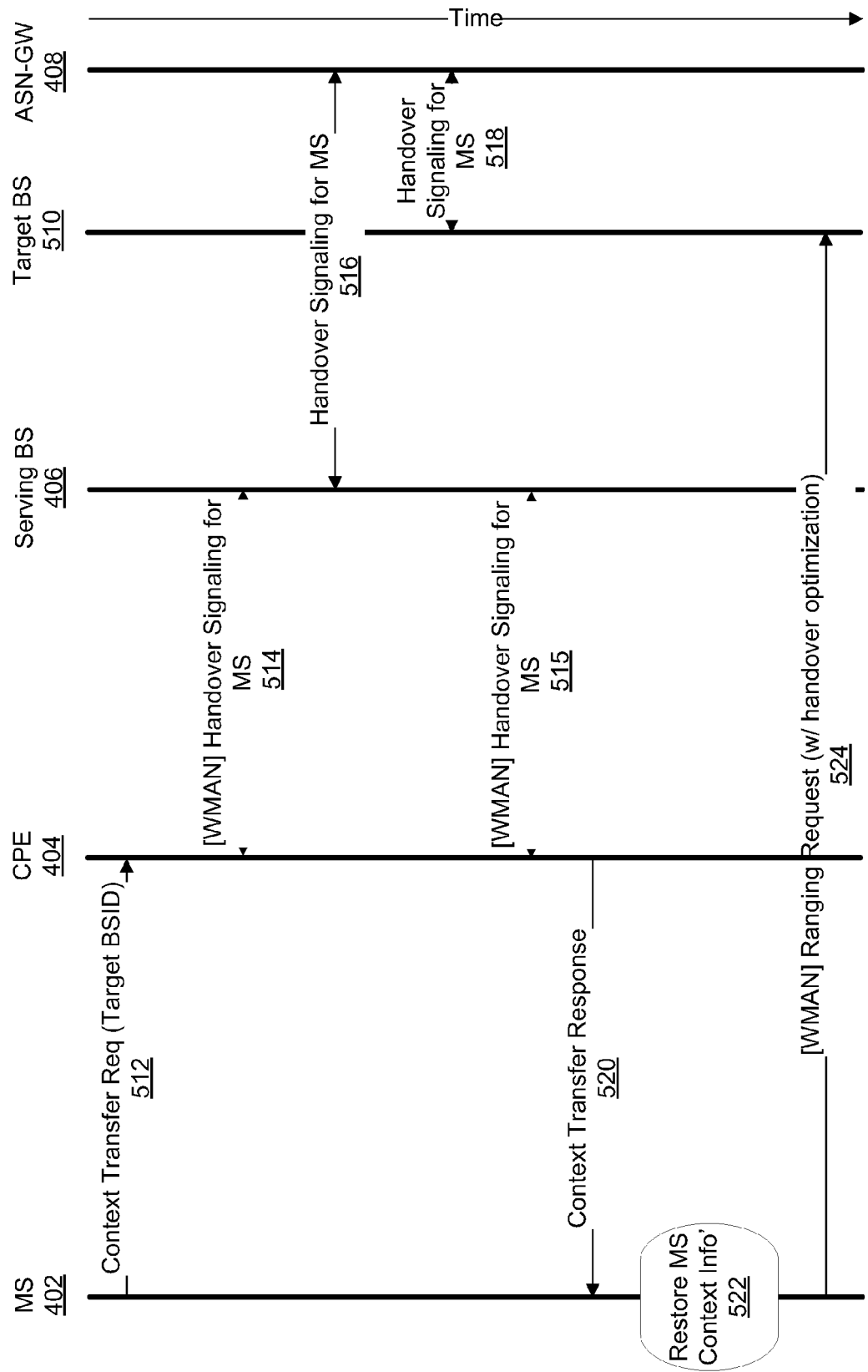
FIG. 5 is a timing diagram of a wireless network in accordance with an example embodiment of the disclosed subject matter.

FIG. 5 is a timing diagram of a wireless network in accordance with an example embodiment of the disclosed subject matter. In one embodiment, the timing diagram may illustrate a handover from the MS 402 using the CPE 404 as the representative or agent of the MS 402 on a WiMAX network to the MS 402 acting on the WiMAX network in its own right, or more generally the termination an agent apparatus relationship on a first network. FIG. 5 illustrates an embodiment that may be referred to as "make-before-break" in that the MS 402 may re-establish itself on the WiMAX network before breaking the connection with the CPE 404. In various embodiments, the timing diagram 500 may include the use of a system that includes a MS 402, a customer premises equipment (CPE) 404, a access system network gateway (ASN-GW) 408, a target BS 510 and a serving BS 406. In one embodiment, these devices may be illustrated in FIGS. 1 and 3.

In one embodiment, the CPE 404 may broadcast a list of neighbor or surrounding BSs to the MS 402. In one embodiment, an inter-networking handover standard also called media independent handover (MIH) or vertical handover may be used for use a purpose.

Action 512 illustrates that, in one embodiment, a MS 402 may initiate a context transfer request from the CPE 404 as an agent of the MS 402 to using the MS 402 directly on the WiMAX network. In such an embodiment, the MS 402 may de-authorize the CPE 404 to act as its agent, and the MS 402 may begin the process of acting the WiMAX network in its own right. For example, the MS 402 may detect better radio quality from another BS 510; although, it is understood that the above is merely one illustrative example to which the disclosed subject matter is not limited.

In one embodiment, the MS 402 may initiate that handover be transmitting a context transfer request to the CPE 404. In one embodiment, the context transfer request may include BS identifier (BSID) of the target BS 510. In one embodiment, the context transfer request, and response of Action 520, may be encapsulated within the WLAN networking protocol. In another embodiment, the messages may occur out-of-band. In yet another embodiment, the messages may occur between the CPE 404 and the MS 402 using the WiMAX networking protocol, or a combination of all three schemes may be used.

In the embodiment of FIG. 5, the serving BS 406 may be the BS that is being used by the CPE 404 as an agent for the MS 402. In one embodiment, the serving BS 406 may also be a BS that was last used by the MS 402 when the MS 402 left the WiMAX network (to join the WLAN). In one embodiment, the target BS 510 may be used by the MS 402 to re-enter the WiMAX network. In various embodiments, the serving BS 406 and the target BS 510 may be the same; however, this is not illustrated in FIG. 5, and such a procedure would be understood by one skilled in the art given the embodiment illustrated by FIG. 5. In one embodiment, the serving BS 406 may include the serving BS 104 of FIG. 3. While the target BS 510 may include the target BS 304 of FIG. 3.

Action 514 illustrates that, in one embodiment, the received context transfer request may trigger or cause the CPE 404 to initiate a handover for the MS 402 using the WiMAX networking protocol. In one embodiment, the handover signaling may include the ID of the target BS 510. In various embodiments, the handover signaling may include ranging requests and responses, as described above and further detailed in the WiMAX specification; Although, it is understood that the above are merely one illustrative example and other protocols may be used to which the disclosed subject matter is not limited.

Actions 516 and 518 illustrates that, in one embodiment, the serving BS 406 and the target BS 510 may exchange handover information via the ASN-GW 408 or other third party device. In various embodiments, the handover information may include the MS 402's context information and a change in the data paths from the serving BS 406 to the target BS 510. In some embodiments, in which the serving and targets BSs are the same device, or in direct communication, Actions 516 & 518 may not be used.

Action 515 illustrates that, in one embodiment, once the context handover of Actions 516 & 518 are completed the handover signaling of Action 514 may complete. In one embodiment, this may include transmitting a ranging response from the serving BS 406 to the CPE 404.

Action 520 illustrates that, in one embodiment, the CPE 404 may push the stored MS context information from the CPE 404 to the MS 402. In various embodiments, the context information may include, but is not limited to security context, QoS context, capability context, etc. In one embodiment, the CPE 404 may delete the MS context information after it has been transferred to the MS 402.

Action 522 illustrates that, in one embodiment, the MS 402 may restore the WiMAX context information that was previously used by the CPE 404. The restoration of the MS context information may represent the breaking of the agency relationship between the MS 402 and the CPE 404. In various embodiments, if the MS capability information previously reported by the CPE 404 is different that of that actual MS 402, the MS 402 may initiate a new capability information exchange after the handover to the target BS 510 has been completed.

Action 524 illustrates that, in one embodiment, the MS 402 may initiate a ranging request with the target BS 510. In one embodiment, the ranging request may include a handover optimization field or TLV that indicates a handover optimization scheme to use to facilitate the handover. Further, handover and subsequent communication interactions between the target BS 510 and the MS 402 may continue as normally dictated or allowed by the appropriate WiMAX or first networking protocol. As described above, the MS 402 may additionally initiate a capability information update message to the target BS 510.

FIG. 6 is a timing diagram of a wireless network in accordance with an example embodiment of the disclosed subject matter. In one embodiment, the timing diagram may illustrate a handover from the MS 402 using the CPE 404 as the representative or agent of the MS 402 on a WiMAX network to the MS 402 acting on the WiMAX network in its own right, or more generally the termination an agent apparatus relationship on a first network. FIG. 6 illustrates an embodiment that may be referred to as "break-before-make" in that the MS 402 may re-establish itself on the WiMAX network after breaking the connection with the CPE 404. In various embodiments, the timing diagram 600 may include the use of a system that includes a MS 402, a customer premises equipment (CPE) 404, a access system network gateway (ASN-GW) 408, a target BS 510 and a serving BS 406. In one embodiment, these devices may be illustrated in FIGS. 1 and 3.

Action 612 illustrates that, in one embodiment, the MS 402 may initiate a handover from the CPE 404 to the target BS 510 by transmitting a context transfer request to the CPE 404. In one embodiment, the context transfer request may include a field indicating the target BSID, as described above.

Action 614 illustrates that, in one embodiment, the CPE 404 may response with a context transfer response, as described above. In such an embodiment, the context transfer response may include, but is not limited to security context, QoS context, capability context, etc. In one embodiment, the CPE 404 may delete the MS context information after it has been transferred to the MS 402.

Action 616 illustrates that, in one embodiment, the MS 402 may restore the WiMAX context information that was previously used by the CPE 404. The restoration of the MS context information may represent the breaking of the agency relationship between the MS 402 and the CPE 404. In various embodiments, if the MS capability information previously reported by the CPE 404 is different that of that actual MS 402, the MS 402 may initiate a new capability information exchange after the handover to the target BS 510 has been completed.

Action 618 illustrates that, in one embodiment, the MS 402 may transmit a ranging request to the target BS 510. In one embodiment, the ranging request may include a handover optimization field, as described above. In one embodiment, the ranging request may also include the BSID of the serving BS 406. In one embodiment, as the MS 402 may be effectively directly on the WiMAX network, the BS-to-BS handover may occur as dictated by the WiMAX standard; however, it is understood that the disclosed subject matter is not limited to any particular protocol and the WiMAX is just an illustrative example.

Actions 620 & 622 illustrates that, in one embodiment, the target BS 510 may transfer any MS context information from the serving BS 406 to the target BS 510. In one embodiment, the target BS 510 may use the ASN-GW 408 or other device as an intermediary. In such an embodiment, the ASN-GW 408 may receive a request for the context information from the target BS 510, retrieve the context information from the serving BS 406, and forward that context information to the target BS 510.

Action 624 illustrates that, in one embodiment, the target BS 510 may transmit a ranging response to the MS 402 via the WiMAX networking protocol. In one embodiment, the MS 402 may then use the target BS 510 to communicate via the WiMAX network.

FIG. 7 is a timing diagram of a wireless network in accordance with an example embodiment of the disclosed subject matter. In one embodiment, the timing diagram may illustrate a handover from the MS 402 acting on the WiMAX network in its own right to the MS 402 using the CPE 404 as the representative or agent of the MS 402 on a WiMAX network, or more generally the establishment or re-establishment of an agent apparatus relationship on a first network. FIG. 7 illustrates an embodiment that may be referred to as "make-before-break" in that the MS 402 may establish or re-establish the connection with the CPE 404 after removing itself or breaking itself off from the WiMAX network. In various embodiments, the timing diagram 700 may include the use of a system that includes a MS 402, a customer premises equipment (CPE) 404, a access system network gateway (ASN-GW) 408, a target BS 510 and a serving BS 406. In one embodiment, these devices may be illustrated in FIGS. 1 and 3.

In one embodiment, the embodiment of FIG. 7 may illustrate a MS 402 moving from a serving BS 406 to a target BS 510. Or, more accurately, from a serving BS 406 to a CPE 404 that uses a target BS 510. In other embodiments, the MS 402 may move directly to an agency relationship with the CPE 404. One skilled in the art will understand such an embodiment, in which the serving and target BSs are the same, when shown FIG. 7 or 8. In another embodiment, in which no serving BS existed, is illustrated in FIG. 4 and described above.

Action 712 illustrates that, in one embodiment, the MS 402 may wish to transition from the WiMAX network to the WLAN. In one embodiment, this may be because the MS 402 has detected better radio quality from the WLAN, and that the WLAN includes a CPE 404 that provides multi-host support for both the WLAN and WiMAX network; although, it is understood that the above is merely one illustrative example to which the disclosed subject matter is not limited.

Action 712 illustrates that, in one embodiment, the MS 402 may initiate a MS handover by transmitting, via the WiMAX network, a mobile MS handover Request (MOB_MSHO_REQ or MSHO_REQ) to the serving BS 406. In one embodiment, the MS Handover Request 712 may indicate that the MS 402 intends to handover to (or authorize as its agent) a CPE 404 with multi-host support. In such an embodiment, the MS Handover Request 712 may indicate the ID of the CPE 404. In one embodiment, the MSHO_REQ may include the BSID of the target BS 510 used by the CPE 404. In one embodiment, the CPE 404 may broadcast a WLAN SSID, as described above. In such an embodiment, the CPE 404 WLAN SSID may be in a format that is readily decodable into a target BS ID (BSID) for the BS used by the CPE 404 (e.g., a subset of the CPE-ID may be include the BSID). In another embodiment, the CPE 404 may broadcast or provide on request the ID of the CPE's BS 510.

Actions 714 & 716 illustrate that, in one embodiment, the target BS 510 and the serving BS 406 may exchange the MS's context information and other associated information during the MS handover procedure. In one embodiment, the two BSs may perform the handover operation as dictated by the WiMAX standard; although, it is understood that the disclosed subject matter is not limited to any particular protocol. In one embodiment, Actions 714 & 716 may not be used if the target and serving BSs are the same device.

Action 718 illustrates that, in one embodiment, after receiving the WiMAX context information for the MS 402, the target BS 510 may transfer the MS's context information to the CPE 404. As described above, in one embodiment, the MS's WiMAX context information may include, but is not limited to, security context, QoS context, capability context, target BS ID, etc.

Action 720 illustrates that, in one embodiment, the CPE 404 may restore or store in memory the MS's WiMAX context information. In one embodiment, the CPE 404 may pre-emptively convert the MS's WiMAX context information to a WLAN context equivalent. In various embodiments, if the WiMAX capability of the CPE 404 is not the same as the MS 402, the CPE 404 may initiate a new capability exchange after the MS 402 handover to the CPE 404 is complete. Such a capability exchange was described above in reference to FIG. 4.

Action 722 illustrates that, in one embodiment, once the WiMAX handover (from serving BS 406 to target BS 510) is complete, the serving BS 406 transmit a MS handover response (MOB_MSHO_RSP or MSHO_RSP) to the MS 402. In various embodiments, this MSHO_RSP may be transmitted using the WiMAX networking protocol.

In one embodiment, the MSHO_RSP may be treated as the breaking of the MS 402 from the WiMAX network and the acknowledgment that the CPE 404 will be acting as the MS's agent on the WiMAX network. In another embodiment, Action 726 may be considered the breaking of the MS 402 from the WiMAX network, as described below.

Action 724 illustrates that, in one embodiment, the MS 402 and the CPE 404 may perform a WLAN association. In such an embodiment, the MS 402 may become established on the WLAN. In various embodiments, the MS 402 may be said to make a connection with the WLAN.

Action 726 illustrates that, in one embodiment, an association request from the MS 402 in Action 724 may trigger or result in the CPE 406 transmitting a handover indication (MOD_HO_IND or HO_IND) message to the serving BS 406. In one embodiment, the HO_IND may include a message that indicates the completion (successful or otherwise) of the MS handover from the serving BS 406 to the target BS 510. It is noted that this indication may, in one embodiment, not come from the MS 402 that initiated the handover, but from the MS's agent the CPE 404.

In one embodiment, the HO_IND may be treated as the breaking of the MS 402 from the WiMAX network and the acknowledgment that the CPE 404 will be acting as the MS's agent on the WiMAX network. In another embodiment, Action 722 may be considered the breaking of the MS 402 from the WiMAX network, as described above.

Action 434 illustrates that, in one embodiment, once the MS 402 is established on the WLAN and the CPE 404 is established as the MS's agent, data transfer may occur between the two networks, as described above. In one embodiment, the CPE 404 may provide interworking between data transmission from the WLAN to the WiMAX network (and vice versa), as described above.

FIG. 8 is a timing diagram of a wireless network in accordance with an example embodiment of the disclosed subject matter. In one embodiment, the timing diagram may illustrate a handover from the MS 402 acting on the WiMAX network in its own right to the MS 402 using the CPE 404 as the representative or agent of the MS 402 on a WiMAX network, or more generally the establishment or re-establishment of an agent apparatus relationship on a first network. FIG. 8 illustrates an embodiment that may be referred to as "no-break-and-make" in that the MS 402 may establish or re-establish the connection with the CPE 404 before removing itself or breaking itself off from the WiMAX network. In various embodiments, the timing diagram 800 may include the use of a system that includes a MS 402, a customer premises equipment (CPE) 404, a access system network gateway (ASN-GW) 408, a target BS 510 and a serving BS 406. In one embodiment, these devices may be illustrated in FIGS. 1 and 3.

Action 812 illustrates that, in one embodiment, the MS 402 may detect the WLAN and the CPE 404 capable of acting as a multi-host agent for the MS 402. In such an embodiment, the MS 402 and the CPE 404 may perform a WLAN association. In such an embodiment, the MS 402 may become established on the WLAN. In various embodiments, the MS 402 may be said to make a connection with the WLAN.

Action 814 illustrates that, in one embodiment, after becoming associated and in communication with the CPE 404, the MS 402 may transmit a handover request (HO-REQ) to the CPE 404. In one embodiment, the HO-REQ may be made using the WLAN or, in others embodiments, using the WiMAX network, an out-of-band communication technique or a combination of the above. In one embodiment, the HO-REQ may include the BSID of the serving BS 406. In one embodiment, the HO-REQ may also include a ranging request that includes fields of TLVs that instructs the CPE 404 to use a handover optimization scheme. In various embodiments, the ranging request may use a keyed-Hash Message Authentication Code (HMAC or KHMAC) to authenticate the message. In another embodiment, other forms of authentication may be used. In one embodiment, the ranging request may include an indication that the MS 402 intends to use the CPE 404 for multi-host support.

Action 816 illustrates that, in one embodiment, the CPE 404 may forward or, in one embodiment, convert the MS's Handover Request message 814 to a ranging request 816 formatted for the WiMAX or first network. In one embodiment, the CPE 404 may simply de-encapsulate the Handover Request 814. In another embodiment, the CPE 404 may extract various fields form the Handover Request 814 and create an appropriate WiMAX message that will include the desired effect of the ranging request 814. This WiMAX ranging request 816 may be transmitted to the target BS 510 via the WiMAX network.

Actions 818 & 820 illustrates that, in one embodiment, the target BS 510 and the serving BS 406 may exchange the MS's context information and other associated information during the MS handover procedure. In one embodiment, the two BSs may perform the handover operation as dictated by the WiMAX standard; although, it is understood that the disclosed subject matter is not limited to any particular protocol. In one embodiment, Actions 818 & 820 may not be used if the target and serving BSs are the same device.

Action 822 illustrates that, in one embodiment, after receiving the WiMAX context information for the MS 402, the target BS 510 may transfer the MS's context information to the CPE 404. As described above, in one embodiment, the MS's WiMAX context information may include, but is not limited to, security context, QoS context, capability context, target BS ID, etc.

Action 824 illustrates that, in one embodiment, the CPE 404 may restore or store in memory the MS's WiMAX context information. In one embodiment, the CPE 404 may pre-emptively convert the MS's WiMAX context information to a WLAN context equivalent. In various embodiments, if the WiMAX capability of the CPE 404 is not the same as the MS 402, the CPE 404 may initiate a new capability exchange after the MS 402 handover to the CPE 404 is complete. Such a capability exchange was described above in reference to FIG. 4.

Action 826 illustrates that, in one embodiment, upon the establishment of the MS's context information within the CPE 404, the target BS 510 may transmit a ranging response (RNG-RSP) 826 to the CPE 404. In one embodiment, the RNG-RSP 826 may include a MAC management message responding to the RNG-REQ 816. In one embodiment, the RNG-RSP 826 may include an indication that the WiMAX network in general, and the target BS 510 in specific acknowledge the CPE 404 as the agent of the MS 402 on the WiMAX network.

Action 828 illustrates that, in one embodiment, the CPE 404 may transmit a handover response (HO-RSP) to the MS 402. In one embodiment, this handover response may be in response to the handover request 814. In various embodiments, the HO-RSP 828 may be transmitted to the MS 402 using the same scheme as used to transmit the HO-REQ 814; although, it is understood that the above is merely one illustrative example to which the disclosed subject matter is not limited. In some embodiments, this HO-RSP 828 may serve as an indication to the MS 402 that the CPE 404 is established as the MS's agent on the WiMAX network.

Action 434 illustrates that, in one embodiment, once the MS 402 is established on the WLAN and the CPE 404 is established as the MS's agent, data transfer may occur between the two networks, as described above. In one embodiment, the CPE 404 may provide interworking between data transmission from the WLAN to the WiMAX network (and vice versa), as described above.

FIG. 9 is a flowchart of a technique 900 in accordance with an example embodiment of the disclosed subject matter. In various embodiments, parts or all of the technique 900 may be used to produce a system or apparatus confirming to the timing diagram of FIG. 4. Although, it is understood that other systems and timing diagrams my result from the use of technique 900. Furthermore, it is understood that FIGS. 9a, 9b, 9c and 9d represent a single flowchart illustrated on multiple pages and connected via the connectors of Block 924, here-before and here after the multiple pages will simply be referred to as FIG. 9.

In one embodiment, the technique 900 may illustrate a method of using a customer premises equipment (CPE) to represent a mobile station (MS) to a base station (BS). In such an embodiment, the CPE and the BS may be part of a first wireless network based upon a first networking standard, and the MS and the CPE may be part of a second wireless network based upon a second networking standard. In one embodiment, the first wireless standard may include a standard substantially compliant with the WiMAX standard. In one embodiment, the second wireless standard may include a standard substantially compliant with the WiFi standard.

Block 902 illustrates that, in one embodiment, the MS may be associated with the CPE. Block 904 illustrates that, in one embodiment, associating may include the CPE may indicate to the MS, via the first network, that the CPE is part of the second network and is capable of acting as an agent, on the second network for the MS. Block 906 illustrates that, in one embodiment, associating may include receiving, by the CPE, an association request from the MS. In various embodiments, the transceiver 212 of FIG. 2 or the CPE 308 of FIG. 3 may perform the association, as described above.

Block 908 illustrates that, in one embodiment, an indication may be sent to the BS that the CPE is acting as an agent for the MS on the second wireless network. In various embodiments, the transceiver 212 of FIG. 2 or the CPE 308 of FIG. 3 may perform this action, as described above. In one embodiment, the BS 104 of FIG. 3 may receive this indication, as described above.

Block 910 illustrates that, in one embodiment, indicating may include transmitting, via the first network, a ranging request to the BS. Block 912 illustrates that, in one embodiment, the ranging request may include: a MS agent field indicating that the CPE is acting as an agent for the MS, and a medium access control (MAC) address of the MS on the first network, as described above. In various embodiments, the transceiver 212 of FIG. 2 or the CPE 308 of FIG. 3 may perform these actions, as described above.

Block 914 illustrates that, in one embodiment, indicating may include receiving, from the BS, a message indicating at least one connection identifier (CID) associated with the MS, as described above. Block 916 illustrates that, in one embodiment, indicating may include transmitting, to the MS via the second network, the at least one CID received from the BS, as described above. In various embodiments, the transceiver 212 of FIG. 2 or the CPE 308 of FIG. 3 may perform these actions, as described above.

Block 918 illustrates that, in one embodiment, indicating may include determining whether or not the BS has already been provided with CPE networking capability information, as described above. Block 920 illustrates that, if not, in one embodiment, providing the BS with the CPE networking capability information, wherein the BS uses the CPE networking capability information as the MS networking capability information, as described above. In various embodiments, the transceiver 212 or controller 214 of FIG. 2 or the CPE 308 of FIG. 3 may perform these actions, as described above.

Block 922 illustrates that, in one embodiment, the CPE may store context information related to the MS. In one embodiment, the context information may include MS context information related the first network and MS context information related the second network, as described above. In various embodiments, the memory 216 of FIG. 2 or the CPE 308 of FIG. 3 may perform these actions, as described above.

Block 924 illustrates that, in one embodiment, the CPE may act as an agent, on the second network, for the MS, as described above. In various embodiments, the apparatus 211 of FIG. 2 or the CPE 308 of FIG. 3 may perform this action, as described above.

Block 930 illustrates that, in one embodiment, acting as an agent may include receiving, via the second wireless network, an authentication procedure message from the MS, wherein the authentication procedure message includes MS security context information based upon the MS's subscription information for the first network, as described above. In various embodiments, the transceiver 212 of FIG. 2 or the CPE 308 of FIG. 3 may perform this action, as described above.

Block 932 illustrates that, in one embodiment, acting as an agent may include converting the authentication procedure message from the second networking standard to the first networking standard, as described above. In various embodiments, the internetworking engine 220 of FIG. 2 or the CPE 308 of FIG. 3 may perform this action, as described above.

Block 934 illustrates that, in one embodiment, acting as an agent may include transmitting, via the first network, the converted authentication procedure message to the BS, as described above. Block 935 illustrates that, in one embodiment, the WiMAX authentication messages, sent from the MS, may be encapsulated. In various embodiments, the CPE may filter the messages sent from the MS, so that only the authentication messages are forwarded to the WiMAX network. In various embodiments, the transceiver 212 of FIG. 2 or the CPE 308 of FIG. 3 may perform this action, as described above.

Block 936 illustrates that, in one embodiment, acting as an agent may include receiving an authentication key (AK-MS), associated with the MS, and traffic encryption keys (TEKs) from the BS, as described above. In various embodiments, the transceiver 212 of FIG. 2 or the CPE 308 of FIG. 3 may perform this action, as described above.

Block 938 illustrates that, in one embodiment, acting as an agent may include receiving, via the second wireless network, a network address request from the MS, as described above. In various embodiments, the transceiver 212 of FIG. 2 or the CPE 308 of FIG. 3 may perform this action, as described above.

Block 940 illustrates that, in one embodiment, acting as an agent may include converting the network address request from the second networking standard to the first networking standard, as described above. In various embodiments, the internetworking engine 220 of FIG. 2 or the CPE 308 of FIG. 3 may perform this action, as described above.

Block 942 illustrates that, in one embodiment, acting as an agent may include transmitting, via the first wireless network, the converted network address request, as described above. In various embodiments, the transceiver 212 of FIG. 2 or the CPE 308 of FIG. 3 may perform this action, as described above.

Block 944 illustrates that, in one embodiment, acting as an agent may include receiving a network address associated with the MS, as described above. In various embodiments, the transceiver 212 of FIG. 2 or the CPE 308 of FIG. 3 may perform this action, as described above.

Block 950 illustrates that, in one embodiment, acting as an agent may include establishing at least one service flow on the first wireless network for the use of the MS, as described above. In various embodiments, the apparatus 211 of FIG. 2 or the CPE 308 of FIG. 3 may perform this action, as described above.

Block 952 illustrates that, in one embodiment, establishing at least one service flow may include receiving, via the second network, an add traffic stream (ADDTS) request from the MS indicating that a certain level of quality of service (QoS) should be provided for the transmission of data, as described above. In various embodiments, the transceiver 212 of FIG. 2 or the CPE 308 of FIG. 3 may perform this action, as described above.

Block 954 illustrates that, in one embodiment, establishing at least one service flow may include converting the ADDTS request to a QoS request for the first network, as described above. In various embodiments, the internetworking engine 220 of FIG. 2 or the CPE 308 of FIG. 3 may perform this action, as described above.

Block 956 illustrates that, in one embodiment, establishing at least one service flow may include establishing a service flow using the converted ADDTS request, as described above. In various embodiments, the transceiver 2121, controller 214 and internetworking engine 220 of FIG. 2 or the CPE 308 of FIG. 3 may perform this action, as described above.

Block 958 illustrates that, in one embodiment, acting as an agent may include receiving, from the first network, MS context information associated with the service flow and the MS, as described above. In various embodiments, the transceiver 212 of FIG. 2 or the CPE 308 of FIG. 3 may perform this action, as described above.

Block 960 illustrates that, in one embodiment, acting as an agent may include converting at least a portion of the received MS context information related the first network to MS context information related the second network, as described above. In various embodiments, the internetworking engine 220 of FIG. 2 or the CPE 308 of FIG. 3 may perform this action, as described above.

Block 962 illustrates that, in one embodiment, acting as an agent may include transmitting the MS context information related the second network to the MS, via the second network, as described above. In various embodiments, the transceiver 212 of FIG. 2 or the CPE 308 of FIG. 3 may perform this action, as described above.

Block 970 illustrates that, in one embodiment, acting as an agent may include receiving data from the MS, via the second network, as described above. In various embodiments, the transceiver 212 of FIG. 2 or the CPE 308 of FIG. 3 may perform this action, as described above.

Block 972 illustrates that, in one embodiment, acting as an agent may include converting the received data for transmission via the first network, as described above. In various embodiments, the internetworking engine 220 of FIG. 2 or the CPE 308 of FIG. 3 may perform this action, as described above.

Block 974 illustrates that, in one embodiment, acting as an agent may include transmitting the converted data to the BS, via the first network, using a connection identifier (CID) of the MS on the first network, as described above. In various embodiments, the transceiver 212 of FIG. 2 or the CPE 308 of FIG. 3 may perform this action, as described above.

FIG. 10 is a flowchart of a technique 1000 in accordance with an example embodiment of the disclosed subject matter. In various embodiments, parts or all of the technique 1000 may be used to produce a system or apparatus confirming to the timing diagrams of FIGS. 5 and 6. Although, it is understood that other systems and timing diagrams my result from the use of technique 1000. Furthermore, it is understood that FIGS. 10a and 10b represent a single flowchart illustrated on multiple pages and connected via the connector 1001, herebefore and here after the multiple pages will simply be referred to as FIG. 10.

Block 1002 illustrates that, in one embodiment, a MS may establish, via a customer premises equipment (CPE), itself on a wireless local area network (WLAN), as described above. As described above, in one embodiment, the WLAN may include a network substantially compliant with WiFi standard. In one embodiment, the apparatus 201 of FIG. 2 or the MS 106 of FIG. 3 may perform this action, as described above.

Block 1004 illustrates that, in one embodiment, a MS may establishing an agency relationship with the CPE to represent the MS on a wireless metropolitan area network (WMAN), as described above. As described above, in one embodiment, the WMAN may include a network substantially compliant with WiMAX standard. In one embodiment, the apparatus 201 of FIG. 2 or the MS 106 of FIG. 3 may perform this action, as described above.

Block 1006 illustrates that, in one embodiment, establishing an agency relationship may include the CPE indicating to other devices on the WMAN that the CPE is representing the MS, as described above. Block 1008 illustrates that, in one embodiment, establishing an agency relationship may include the CPE maintaining a set of WMAN context information associated with the MS, as described above. Block 1010 illustrates that, in one embodiment, the set of WMAN context information associated with the MS may include: WMAN quality of service information associated with the MS, WMAN security information associated with the MS, reported MS WMAN capability information, and WMAN service flow information associated with the MS, as described above. In one embodiment, the CPE 308 of FIG. 3 may perform these actions, as described above.

Block 1012 illustrates that, in one embodiment, the MS may perform a context transfer from the CPE to the MS, wherein once the handover is complete the MS may represent itself on the WMAN, as described above. In one embodiment, the apparatus 201, transceiver 202 or controller 204 of FIG. 2 or the MS 106 of FIG. 3 may perform this action, as described above.

Block 1014 illustrates that, in one embodiment, performing may include requesting that the CPE initiate a transfer of a set of WMAN context information associated with the MS, as described above. Block 1016 illustrates that, in one embodiment, requesting may include transmitting a target BS identifier to the CPE, wherein the target BS identifier indentifies a WMAN base station the MS intends to directly associate with, as described above. Block 1018 illustrates that, in one embodiment, requesting may include causing the CPE to, as an agent of the MS, perform a base station handover on the WMAN, for the benefit of the MS, from a serving BS, associated with the CPE, to the target BS, as described above. In one embodiment, the transceiver 202 or controller 204 of FIG. 2 or the MS 106 of FIG. 3 may perform these actions, as described above.

Block 1050 illustrates that, in one embodiment, performing may include receiving, from the CPE, the set of WMAN context information associated with the MS, as described above. Block 1052 illustrates that, in one embodiment, receiving may include receiving the set of WMAN context information occurs after the CPE has performed the base station handover, as described above. Block 1054 illustrates that, in one embodiment, receiving may include causing the CPE to, as an agent of the MS, perform a base station handover on the WMAN, for the benefit of the MS, from a serving BS, associated with the CPE, to the target BS, as described above. In one embodiment, the transceiver 202 or controller 204 of FIG. 2 or the MS 106 of FIG. 3 may perform these actions, as described above.

Block 1056 illustrates that, in one embodiment, the set of WMAN context information associated with the MS, may be restored to the control and dominion of the MS, as described above. In one embodiment, the memory 206 or controller 204 of FIG. 2 or the MS 106 of FIG. 3 may perform this action, as described above.

Block 1058 illustrates that, in one embodiment, the MS may directly communicate via the WMAN without the CPE as an agent, as described above. In one embodiment, the transceiver 202 or controller 204 of FIG. 2 or the MS 106 of FIG. 3 may perform this action, as described above.

Block 1060 illustrates that, in one embodiment, communicating may include transmitting a ranging request to a target BS, wherein the ranging request initiates a mobile station handover from a serving BS that was used by the CPE to the target BS, as described above. Block 1062 illustrates that, in one embodiment, the ranging request may include a handover optimization field indicating a handover optimization technique to use; and an identifier indicating the serving BS, as described above. In one embodiment, the transceiver 202 or controller 204 of FIG. 2 or the MS 106 of FIG. 3 may perform these actions, as described above.

Block 1064 illustrates that, in one embodiment, communicating may include receiving a ranging response indicating the success of the handover, as described above. In one embodiment, the transceiver 202 of FIG. 2 or the MS 106 of FIG. 3 may perform this action, as described above.

Block 1066 illustrates that, in one embodiment, the MS may initiate a MS capabilities exchange with the target BS to replace a reported set of MS WMAN capabilities, reported by the CPE, with an actual set of MS WMAN capabilities, as described above. In one embodiment, the transceiver 202 of FIG. 2 or the MS 106 of FIG. 3 may perform this action, as described above.

FIG. 11 is a flowchart of a technique 1100 in accordance with an example embodiment of the disclosed subject matter. In various embodiments, parts or all of the technique 1100 may be used to produce a system or apparatus confirming to the timing diagrams of FIGS. 7 and 8. Although, it is understood that other systems and timing diagrams my result from the use of technique 1100.

Block 1102 illustrates that, in one embodiment, an MS may detect a customer premises equipment (CPE) that is configured to act as an access point to a wireless local area network (WLAN) and as an agent for mobile stations on a WMAN, as described above. Block 1104 illustrates that, in one embodiment, detecting may include detecting a CPE identifier that includes a base station identifier (BSID) of a bases station used by the CPE to access the WMAN, as described above. In one embodiment, the transceiver 202 or controller 204 of FIG. 2 or the MS 106 of FIG. 3 may perform these actions, as described above.

Block 1106 illustrates that, in one embodiment, the MS may become established on the WLAN via the CPE, as described above. Block 1108 illustrates that, in one embodiment, establishing the MS on the WLAN via the CPE may occur after the receipt of the MS handover response from the serving BS of Block 1124, as described above. In one embodiment, the transceiver 202 or controller 204 of FIG. 2 or the MS 106 of FIG. 3 may perform these actions, as described above.

Block 1110 illustrates that, in one embodiment, the MS may establish the CPE as the agent of the MS on the WMAN, as described above. In one embodiment, the transceiver 202 or controller 204 of FIG. 2 or the MS 106 of FIG. 3 may perform this action, as described above.

Block 1120 illustrates that, in one embodiment, establishing the CPE as the agent of the MS may include transmitting, to a serving base station (BS), a MS handover request that includes a base station identifier (BSID) of a target BS used by the CPE to access the WMAN, as described above. Block 1122 illustrates that, in one embodiment, the MS handover request may cause the serving BS to transfer the set of WMAN context information associated with the MS from the serving BS to the target BS and to the CPE, as described above. In one embodiment, the transceiver 202 or controller 204 of FIG. 2 or the MS 106 of FIG. 3 may perform this action, as described above.

Block 1124 illustrates that, in one embodiment, establishing the CPE as the agent of the MS may include receiving, from the serving BS, a MS handover response indicating the success of the MS handover request, as described above. In one embodiment, the transceiver 202 or controller 204 of FIG. 2 or the MS 106 of FIG. 3 may perform this action, as described above.

Block 1126 illustrates that, in one embodiment, establishing the CPE as the agent of the MS may include transferring a set of WMAN context information associated with the MS to the CPE, as described above. In one embodiment, the transceiver 202 or controller 204 of FIG. 2 or the MS 106 of FIG. 3 may perform this action, as described above.

Block 1130 illustrates that, in one embodiment, establishing the CPE as the agent of the MS may include transmitting a handover request to the CPE requesting that the CPE establish itself as the agent of the MS on the WMAN, as described above. Block 1132 illustrates that, in one embodiment, the handover request may include: a base station identifier (BSID) of a serving base station (BS) currently used by the MS to access the WMAN, an indication that the MS is establishing the CPE as the MS's agent on the WMAN, and a WMAN base station handover optimization scheme to be used when performing a base station from the serving BS to a target BS used by the CPE to access the WMAN, as described above. Block 1134 illustrates that, in one embodiment, the handover request may cause the CPE to transmit a ranging request, to the target BS, including a base station handover request and substantially the contents of the MS handover request, as described above. In one embodiment, the transceiver 202 or controller 204 of FIG. 2 or the MS 106 of FIG. 3 may perform this action, as described above.

Block 1136 illustrates that, in one embodiment, establishing the CPE as the agent of the MS may include receiving a handover response, for the CPE, indicating the success or failure of the handover request, as described above. In one embodiment, the transceiver 202 or controller 204 of FIG. 2 or the MS 106 of FIG. 3 may perform this action, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method of using a customer premises equipment (CPE) to represent a mobile station (MS) to a base station (BS),
    wherein the CPE and the BS are part of a first wireless network based upon a first networking standard, and
    the MS and the CPE are part of a second wireless network based upon a second networking standard;
    the method comprising:
    associating the MS with the CPE;
    indicating to the BS that the CPE is acting as an agent for the MS on the second wireless network;
    acting as the agent, on the second wireless network, for the MS;
    storing context information related to the MS, wherein the context information includes MS context information related the first network and MS context information related the second network; and
    wherein indicating to the BS that the CPE is acting as the agent for the MS includes:
    transmitting, via the first network, a ranging request to the BS, wherein the ranging request includes:
    a MS agent field indicating that the CPE is acting as the agent for the MS, and
    a medium access control (MAC) address of the MS on the first network.

2. The method of claim 1 wherein the first wireless network standard is substantially compliant with the WiMAX standard; and wherein the second wireless network standard substantially compliant with the WiFi standard.

3. The method of claim 1 wherein associating the MS with the CPE includes:
    indicating to the MS, via the first network, that the CPE is part of the second network and is capable of acting as the agent, on the second network for the MS; and
    receiving an association request by the CPE from the MS.

4. The method of claim 1 wherein indicating to the BS that the CPE is acting as the agent for the MS further includes:
    receiving, from the BS, a message indicating at least one connection identifier (CID) associated with the MS.

5. The method of claim 1 wherein indicating to the BS that the CPE is acting as the agent for the MS includes: determining whether or not the BS has already been provided with CPE networking capability information; and if not, providing the BS with the CPE networking capability information, wherein the BS uses the CPE networking capability information as the MS networking capability information.

6. A method of using a customer premises equipment (CPE) to represent a mobile station (MS) to a base station (BS),
    wherein the CPE and the BS are part of a first wireless network based upon a first networking standard, and
    the MS and the CPE are part of a second wireless network based upon a second networking standard;
    the method comprising:
    associating the MS with the CPE;
    indicating to the BS that the CPE is acting as an agent for the MS on the second wireless network;
    acting as the agent, on the second wireless network, for the MS;
    storing context information related to the MS, wherein the context information includes MS context information related the first network and MS context information related the second network; and
    wherein acting as an agent includes: receiving, via the second wireless network, an authentication procedure message from the MS, wherein the authentication procedure message includes MS security context information based upon the MS's subscription information for the first network; converting the authentication procedure message from the second networking standard to the first networking standard; transmitting, via the first network, the converted authentication procedure message to the BS; receiving an authentication key (AK-MS), associated with the MS, and a traffic encryption key (TEK-MS), associated with the MS from the BS; receiving, via the second wireless network, a network address request from the MS; forwarding, via the first wireless network, the network address request; receiving a network address associated with the MS.

7. A method of using a customer premises equipment (CPE) to represent a mobile station (MS) to a base station (BS),
    wherein the CPE and the BS are part of a first wireless network based upon a first networking standard, and
    the MS and the CPE are part of a second wireless network based upon a second networking standard;
    the method comprising:
    associating the MS with the CPE;
    indicating to the BS that the CPE is acting as an agent for the MS on the second wireless network;
    acting as the agent, on the second wireless network, for the MS;
    storing context information related to the MS, wherein the context information includes MS context information related the first network and MS context information related the second network; and
    wherein acting as an agent includes: receiving data from the MS, via the second network. converting the received data for transmission via the first network; transmitting the converted data to the BS, via the first network, using a connection identifier (CID) of the MS on the first network.

8. A method of using a customer premises equipment (CPE) to represent a mobile station (MS) to a base station (BS),
wherein the CPE and the BS are part of a first wireless network based upon a first networking standard, and
the MS and the CPE are part of a second wireless network based upon a second networking standard;
the method comprising:
associating the MS with the CPE;
indicating to the BS that the CPE is acting as an agent for the MS on the second wireless network;
acting as the agent, on the second wireless network, for the MS;
storing context information related to the MS, wherein the context information includes MS context information related the first network and MS context information related the second network; and
wherein acting as an agent includes:
establishing at least one service flow on the first wireless network for the use of the MS;
receiving, from the first network, MS context information associated with the service flow and the MS;
converting at least a portion of the received MS context information related the first network to MS context information related the second network; and
transmitting the MS context information related the second network to the MS, via the second network.

9. The method of claim 8 wherein establishing at least one service flow includes:
receiving, via the second network, an add traffic stream (ADDTS) request from the MS indicating that a certain level of quality of service (QoS) should be provided for the transmission of data; converting the ADDTS request to a QoS request for the first network; and establishing a service flow using the converted ADDTS request.

10. An apparatus comprising: a first wireless transceiver configured to: associate the apparatus with a first wireless network based upon a first networking standard, and communicate with a mobile station (MS) that is part of the first network; a second wireless transceiver configured to: associate the apparatus with a second wireless network based upon a second networking standard, and communicate with a base station (BS) that is part of the second network; an inter-working engine configured to: convert communications from the first networking standard to the second networking standard and vice versa; a controller configured to: communicatively couple the MS with the second network, and act as an agent for the MS on the second network such that an accounting may be made of the activities of the MS on the second network; and a memory configured to: store context information related to the MS, wherein the context information includes MS context information related the first network and MS context information related the second network.

11. The apparatus of claim 10 wherein the second wireless network standard includes the WiMAX standard; and wherein the first wireless network standard includes the WiFi standard.

12. The apparatus of claim 10 wherein the second wireless transceiver is configured to, when acting as the agent for the MS, transmit data using a connection identifier of the MS.

13. The apparatus of claim 10 wherein the controller is configured to: establish at least one service flow within the second network for the use of the MS, wherein the service flow is associated with a set of context information related to the MS and the second network; and
convert the MS context information related to the second network to MS context information related to the first network.

14. The apparatus of claim 10 wherein the second wireless transceiver is configured to: transmit a ranging request to the BS, wherein the ranging request includes: a MS agent field indicating that the CPE is acting as an agent for the MS, and a medium access control (MAC) address of the MS on the second network; and receive a message indicating at least one connection identifier (CID) associated with the MS.

15. The apparatus of claim 14 wherein the first wireless transceiver is configured to:
receive, from the MS, an association request, requesting that the MS join the second network via the apparatus; and upon receipt of the CID associated with the MS, transmit an association response to the MS, indicating that the MS may use the apparatus as an agent on the second network.

16. The apparatus of claim 10 wherein the first wireless transceiver is configured to receive an authentication procedure message from the MS, wherein the authentication procedure message includes MS security context information based upon the MS's subscription information for the second network; wherein the inter-working engine is configured to convert the authentication procedure message from the first networking standard to the second networking standard and wherein the second wireless transceiver is configured to transmit the converted authentication procedure message to the BS.

17. The apparatus of claim 10 wherein the second wireless transceiver is configured to receive, from the BS, an authentication key (AK-MS), associated with the MS, and traffic encryption keys (TEKs), associated with the MS.

18. The apparatus of claim 17 wherein the second wireless transceiver is configured to: receive a traffic encryption key (TEK-CPE), associated with the apparatus, and receive a traffic encryption key (TEK-MS), associated with the MS, from the BS, and when acting as the MS's agent on the second network, communicate with BS using the TEK-CPE to encrypt/decrypt the communication.

19. The apparatus of claim 10 wherein the first wireless transceiver is configured to communicate with a plurality of mobile stations that are part of the first network; and wherein the controller is configured to: communicatively couple the MSs with the second network, and act as an agent for the MSs on the second network such that an accounting may be made of the activities of each MS on the second network.

20. The apparatus of claim 10 wherein the inter-networking engine is configured to convert communications from one networking standard to the other by, depending on the type of communication, either encapsulating the communication or translating the communication to the from one networking standard to the other.

21. A method of using a mobile station comprising:
establishing, via a customer premises equipment (CPE), a mobile station (MS) on a wireless local area network (WLAN); establishing an agency relationship with the CPE to represent the MS on a wireless metropolitan area network (WMAN),
wherein the CPE indicates to other devices on the WMAN that the CPE is representing the MS, and
wherein the CPE maintains a set of WMAN context information associated with the MS;
performing a context transfer from the CPE to the MS, wherein once the handover is complete the MS may represent itself on the WMAN; and
wherein performing a handover includes:

requesting that the CPE initiate a transfer of a set of WMAN context information associated with the MS;

receiving, from the CPE, the set of WMAN context information associated with the MS;

restoring, within the MS, the set of WMAN context information associated with the MS;

and directly communicating via the WMAN without the CPE as an agent.

22. The method of claim 21 further including disassociating the MS from the WLAN.

23. The method of claim 21 wherein the WMAN is substantially compliant with the WiMAX standard; and wherein the WLAN is substantially compliant with the WiFi standard.

24. The method of claim 21 wherein the set of WMAN context information associated with the MS includes: WMAN quality of service information associated with the MS;

WMAN security information associated with the MS; reported MS WMAN capability information; and WMAN service flow information associated with the MS.

25. The method of claim 21 wherein requesting includes transmitting a target BS identifier to the CPE, wherein the target BS identifier indentifies a WMAN base station the MS intends to directly associate with.

26. The method of claim 21 wherein requesting includes: causing the CPE to, as an agent of the MS, perform an interbase station handover on the WMAN, for the benefit of the MS, from a serving BS, associated with the CPE, to the target BS; and wherein receiving the set of WMAN context information occurs after the CPE has performed the inter base station handover.

27. The method of claim 21 further including initiating a MS capabilities exchange with the target BS to replace a reported set of MS WMAN capabilities, reported by the CPE, with an actual set of MS WMAN capabilities.

28. The method of claim 21 wherein directly communicating includes:

transmitting a ranging request to a target BS, wherein the ranging request initiates a base station handover from a serving BS that was used by the CPE to the target BS; and receiving a ranging response indicating the success of the base station handover.

29. The method of claim 28 wherein the ranging request includes a handover optimization field indicating a handover optimization technique to use; and an identifier indicating the serving BS.

30. A method of using a mobile station (MS) that is established on a wireless metropolitan area network (WMAN) comprising:

detecting a customer premises equipment (CPE) that is configured to act as an access point to a wireless local area network (WLAN) and as an agent for mobile stations on the WMAN;

establishing the MS on the WLAN via the CPE; and establishing the CPE as the agent of the MS on the WMAN;

wherein establishing includes transferring a set of WMAN context information associated with the MS to the CPE;

wherein establishing the CPE as the agent of the MS includes: transmitting a handover request to the CPE requesting that the CPE establish itself as the agent of the MS on the WMAN; and receiving a handover response, for the CPE, indicating the success of the handover request; and wherein the handover request includes: a base station identifier (BSID) of a serving base station (BS) currently used by the MS to access the WMAN, an indication that the MS is establishing the CPE as the MS's agent on the WMAN, and a WMAN base station handover optimization scheme to be used when performing a base station from the serving BS to a target BS used by the CPE to access the WMAN; and wherein the handover request causes the CPE to transmit a ranging request, to the target BS, including a base station handover request and substantially the contents of the MS handover request.

31. The method of claim 30 wherein detecting includes detecting a CPE identifier that includes a base station identifier (BSID) of a bases station used by the CPE to access the WMAN.

32. The method of claim 30 wherein establishing the CPE as the agent of the MS includes: transmitting, to a serving base station (BS), a MS handover request that includes a base station identifier (BSID) of a target BS used by the CPE to access the WMAN, an indication that the MS is willing to connect to a CPE, and a CPE identifier; wherein the MS handover request causes the serving BS to transfer the set of WMAN context information associated with the MS from the serving BS to the target BS and to the CPE; and receiving, from the serving BS, a MS handover response indicating the success of the MS handover request.

33. The method of claim 32 wherein establishing the MS on the WLAN via the CPE occurs after the receipt of the MS handover response from the serving BS.

34. The method of claim 30 wherein the set of WMAN context information associated with the MS includes: WMAN quality of service information associated with the MS; WMAN security information associated with the MS; reported MS WMAN capability information; and WMAN service flow information associated with the MS.

* * * * *

UNITED STATES PATENT AND TRADEMARK OFFICE
CERTIFICATE OF CORRECTION

PATENT NO. : 8,121,052 B2
APPLICATION NO. : 12/121417
DATED : February 21, 2012
INVENTOR(S) : Haihong Zheng et al.

Page 1 of 1

It is certified that error appears in the above-identified patent and that said Letters Patent is hereby corrected as shown below:

In the Claims:

In column 24, line 63, in claim 7, delete "network." and insert -- network, --, therefor.

In column 27, line 25, in claim 25, delete "indentifies" and insert -- identifies --, therefor.

In column 27, line 27, in claim 26, delete "claim 2l" and insert -- claim 21 --, therefor.

In column 27, line 34, in claim 27, delete "claim 2l" and insert -- claim 21 --, therefor.

In column 27, line 38, in claim 28, delete "claim 2l" and insert -- claim 21 --, therefor.

Signed and Sealed this
Fourth Day of June, 2013

Teresa Stanek Rea
*Acting Director of the United States Patent and Trademark Office*